US010225193B2

(12) United States Patent
Judge et al.

(10) Patent No.: US 10,225,193 B2
(45) Date of Patent: *Mar. 5, 2019

(54) CONGESTION SENSITIVE PATH-BALANCING

(71) Applicant: Amazon Technologies, Inc., Seattle, WA (US)

(72) Inventors: Alan Michael Judge, Dublin (IE); Matthew Shawn Wilson, Seattle, WA (US)

(73) Assignee: Amazon Technnologies, Inc., Seattle, WA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/362,803

(22) Filed: Nov. 28, 2016

(65) Prior Publication Data
US 2017/0078204 A1  Mar. 16, 2017

Related U.S. Application Data

(63) Continuation of application No. 14/552,373, filed on Nov. 24, 2014, now Pat. No. 9,509,616.

(51) Int. Cl.
H04L 12/28 (2006.01)
H04L 12/803 (2013.01)
(Continued)

(52) U.S. Cl.
CPC ........ H04L 47/125 (2013.01); H04L 12/4633 (2013.01); H04L 47/11 (2013.01); H04L 47/20 (2013.01)

(58) Field of Classification Search
CPC ....... H04L 47/11; H04L 47/20; H04L 47/125; H04L 12/4638

(Continued)

(56) References Cited

U.S. PATENT DOCUMENTS 6,438,603 B1  8/2002  Ogus
6,460,088 B1  10/2002  Merchant
(Continued)

FOREIGN PATENT DOCUMENTS

CA  2130630 A1  4/1995

OTHER PUBLICATIONS

"Carrier Sense Multiple Access," retrieved on Jul. 3, 2014, https://www.princeton.edu/~achaney/tmve/wiki100k/docs/%20Carrier_sense_multiple_access.html, five pages.
(Continued)

Primary Examiner — Thai D Hoang
(74) Attorney, Agent, or Firm — Davis Wright Tremaine LLP

(57) ABSTRACT

Encapsulated packets may be generated for different packets transmitted between a source instance and destination instance in a computer system. The source instance and destination instance may be implemented by different physical hosts linked by multiple network paths. Congestion of the multiple network paths may be determined and path-balancing polices may be implemented in response to the determined congestion. Each encapsulation packet comprises contents of a corresponding packet, and one or more data values selected in accordance with a path-balancing policy. The data values added to one encapsulation packet may differ from those added to another. Different network paths to the destination may be selected for different encapsulation packets of a given transmission based at least in part on the added data values.

20 Claims, 10 Drawing Sheets

(51) Int. Cl.
  *H04L 12/46* (2006.01)
  *H04L 12/801* (2013.01)
  *H04L 12/813* (2013.01)
(58) Field of Classification Search
  USPC .............. 370/229, 230–238.1; 455/450, 453;
   709/238, 239, 240, 241, 242
  See application file for complete search history.

(56) References Cited

U.S. PATENT DOCUMENTS

| | | | |
|---|---|---|---|
| 6,643,256 | B1 | 11/2003 | Shimojo et al. |
| 6,993,021 | B1 | 1/2006 | Chuah et al. |
| 7,102,998 | B1 | 9/2006 | Golestani |
| 7,406,081 | B2 | 7/2008 | Kawakami et al. |
| 7,697,452 | B2* | 4/2010 | Tachibana ........... H04L 12/2602 370/237 |
| 7,796,601 | B1* | 9/2010 | Norman ................... H04L 45/00 370/254 |
| 7,865,586 | B2 | 1/2011 | Cohn |
| 7,911,953 | B1 | 3/2011 | Prestor et al. |
| 7,930,516 | B1 | 4/2011 | Jin et al. |
| 8,134,934 | B2 | 3/2012 | Chen et al. |
| 8,239,572 | B1 | 8/2012 | Brandwine et al. |
| 8,244,909 | B1 | 8/2012 | Hanson et al. |
| 8,289,845 | B1* | 10/2012 | Baldonado .............. H04L 43/16 370/229 |
| 8,331,371 | B2 | 12/2012 | Judge et al. |
| 8,478,896 | B2 | 7/2013 | Ehlers |
| 9,204,315 | B2 | 12/2015 | Sridhar |
| 2003/0039212 | A1 | 2/2003 | Lloyd et al. |
| 2003/0067871 | A1 | 4/2003 | Busi et al. |
| 2003/0133443 | A1 | 7/2003 | Klinker et al. |
| 2003/0161328 | A1 | 8/2003 | Chase et al. |
| 2005/0117521 | A1 | 6/2005 | Abrol et al. |
| 2005/0190694 | A1* | 9/2005 | Ben-Nun ............ H04L 45/7453 370/229 |
| 2006/0072543 | A1 | 4/2006 | Lloyd et al. |
| 2006/0184695 | A1 | 8/2006 | Monelle et al. |
| 2006/0245361 | A1* | 11/2006 | Cheethirala ........... H04L 47/125 370/238 |
| 2008/0008178 | A1* | 1/2008 | Tychon ................... H04L 45/12 370/392 |
| 2008/0037427 | A1 | 2/2008 | Kist |
| 2008/0205272 | A1 | 8/2008 | Vasseur et al. |
| 2009/0279431 | A1 | 11/2009 | Baruah et al. |
| 2011/0063979 | A1* | 3/2011 | Matthews ............. H04L 45/302 370/237 |
| 2011/0075664 | A1 | 3/2011 | Lambeth et al. |
| 2012/0063314 | A1 | 3/2012 | Pignataro et al. |
| 2012/0063316 | A1 | 3/2012 | Ghanwani et al. |
| 2012/0163388 | A1 | 6/2012 | Goel et al. |
| 2015/0188804 | A1* | 7/2015 | Ashwood-Smith ..... H04L 47/32 370/392 |

OTHER PUBLICATIONS

"Congestion Mitigation in Networks Using Flow-Based Hashing," U.S. Appl. No. 13/589,822, filed Aug. 20, 2012.
Allman et al., "TCP Congestion Control," Network Working Group, Request for Comments 2581, Apr. 1999, 14 pages.
Andersson et al., "Multiprotocol Label Switching (MPLS) Label Stack Entry:"EXP" Field Renamed to "Traffic Class" Field," Network Working Group, Request for Comments 5462, Feb. 2009, 9 pages.
Bare et al., "On growth of parallelism within routers and its impact on packet reordering," Proceedings of the 2007 15th IEEE Workshop on Local and Metropolitan Area Networks, Jun. 10, 2007, 5 pages.
Brandwine, U.S. Appl. No. 14/526,410, filed Oct. 28, 2014.
Briscoe, "Tunnelling of Explicit Congestion Notification," Request for Comments: 6040, Standards Track, Nov. 2010, 35 pages.
Cohn et al., U.S. Appl. No. 13/073,182, filed Mar. 28, 2011.
Dommety, "Key and Sequence Number Extensions to GRE," Network Working Group, Requests for Comments 2890, Sep. 2000, 7 pages.
Feamster et al., "The case for separating routing from routers," Proceedings of the ACM SIGCOMM workshop on Future directions in network architecture, Aug. 30, 2004, pages.
Fu et al., "Intra-domain routing convergence with centralized control," Computer Networks 53(18):2985-2996, Jul. 23, 2009.
Fu et al., "Two-stage ip-address lookup in distributed routers," IEEE INFOCOM Workshops 2008, Apr. 13, 2008.
Galliher et al., "Dynamic network device configuration," U.S. Appl. No. 13/252,712, filed Aug. 16, 2016.
Greenberg et al., "VL2: A Scalable and Flexible Data Center Network," Communications of the ACM 54(3):95-104, Mar. 2011.
Grossman, "Large receive offload implementation in neterion 10GbE Ethernet driver," Proceedings of the Linux Symposium 1:195-200, Jul. 20, 2005.
Guo et al., "BCube: A High Performance, Server-centric Network Architecture for Modular Data Centers," SIGCOMM'09, Aug. 17-21, 2009, pp. 1-12.
Judge et al., "Methods and apparatus for internet-scale routing using small-scale border routers," U.S. Appl. No. 12/825,212, filed Jun. 28, 2010.
Karpilovsky et al., "Using forgetful routing to control BGP table size," Proceedings of the 2006 ACM CoNEXT conference, Dec. 4-7, 2006, first disclosed Jan. 2006, 13 pages.
Makineni et al., "Receive Side Coalescing for Accelerating TCP/IP Processing," 13th International Conference on High-Performance Computing (HiPC 2006), Lecture Notes in Computer Science 4297(1):289-300, Dec. 18, 2006.
Parsons et al., "IEEE Std 802.1AX™-2014: IEEE Standard for Local and metropolitan area networks—Link Aggregation," IEEE Computer Society, Dec. 10, 2014, 344 pages.
Postel et al., "Internet Protocol, DARPA Internet Program Protocol Specification," Information Science Institute University of Southern California, Request for Comments 791, Sep. 1981, 50 pages.
Postel, "Assigned Numbers," Network Working Group, Request for Comments 790, Sep. 1981, 15 pages.
Raiciu et al., "Improving Datacenter Performance and Robustness with Multipath TCP," SIGCOMM'11, Aug. 15-19, 2011, pp. 1-12.
Ramakrishnan et al., "The Addition of Explicit Congestion Notification (ECN) to IP," Request for Comments: 3168, Standards Track, Sep. 2001, 63 pages.
Rosen et al., "MPLS Label Stack Encoding," Network Working Group, Request for Comments 3032, Jan. 2001, 23 pages.
Schridde et al., "TrueIP: prevention of IP spoofing attacks using identity-based cryptography," SIN '09: Proceedings of the 2nd international conference on Security of information and networks, Oct. 6-10, 2009.
Vincent et al., "Estimating Round-Trip Times to Improve Network Performance," U.S. Appl. No. 13/589,834, filed Aug. 20, 2011.
VMware, "ESX Configuration Guide: ESX 4.1, vCenter Server 4.1," VMware, Inc., copyright 2009, retrieved Apr. 13, 2017, https://www.vmware.com/pdf/vsphere4/r41/vsp_41_esx_server_config.pdf, 258 pages.
Wikipedia, "Multiprotocol Label Switching," from Wikipedia, the free encyclopedia, retrieved Oct. 21, 2016, from https://wikipedia.org/wiki/Multiprotocol_Label_Switching, 8 pages.
Worster et al., "Encapsulating MPLS in IP or Generic Routing Encapsulation (GRE)," Network Working Group, Request for Comments 4023, Mar. 2005, 14 pages.
Wu et al., "Sorting reordered packets with interrupt coalescing," Computer Networks 53(15):2646-62, Oct. 12, 2009.

\* cited by examiner

CONGESTION SENSITIVE PATH-BALANCING

CROSS REFERENCE TO RELATED APPLICATION

This application is a continuation of U.S. patent application Ser. No. 14/552,373, filed Nov. 24, 2014, entitled "CONGESTION SENSITIVE PATH-BALANCING," the disclosure of which is hereby incorporated herein in its entirety. This application also incorporates by reference for all purposes the full disclosure of co-pending U.S. patent application Ser. No. 14/552,248, filed Nov. 24, 2014, entitled "SELECTIVE ENABLING OF SEQUENCING FOR ENCAPSULATED NETWORK TRAFFIC."

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace; there are private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. As the scale and scope of typical data centers has increased, the tasks of provisioning, administering, and managing the physical computing resources have become increasingly complicated.

The advent of virtualization technologies has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more computer instances hosted by the single physical computing machine, with each such virtual machine being a software simulation acting as a distinct logical computing system that provides users with an experience as if they were the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Operators of networks that enable clients to use hundreds or thousands of virtualized resources within a given data center, or spread over multiple data centers, often set up interconnect topologies that offer multiple parallel physical network paths between a given pair of virtualized resources. However, many conventional approaches to networking may end up underutilizing the bandwidth available for any given high-volume data transfer, e.g., by using only a small subset of the parallel paths available. As a result of the lack of balance in the network traffic, application performance may suffer in at least some cases, and the return on the operator's investment in the high-bandwidth interconnect infrastructure may be less than satisfactory.

BRIEF DESCRIPTION OF THE DRAWINGS

Various embodiments in accordance with the present disclosure will be described with reference to the drawings, in which.

DETAILED DESCRIPTION

Figure 1:
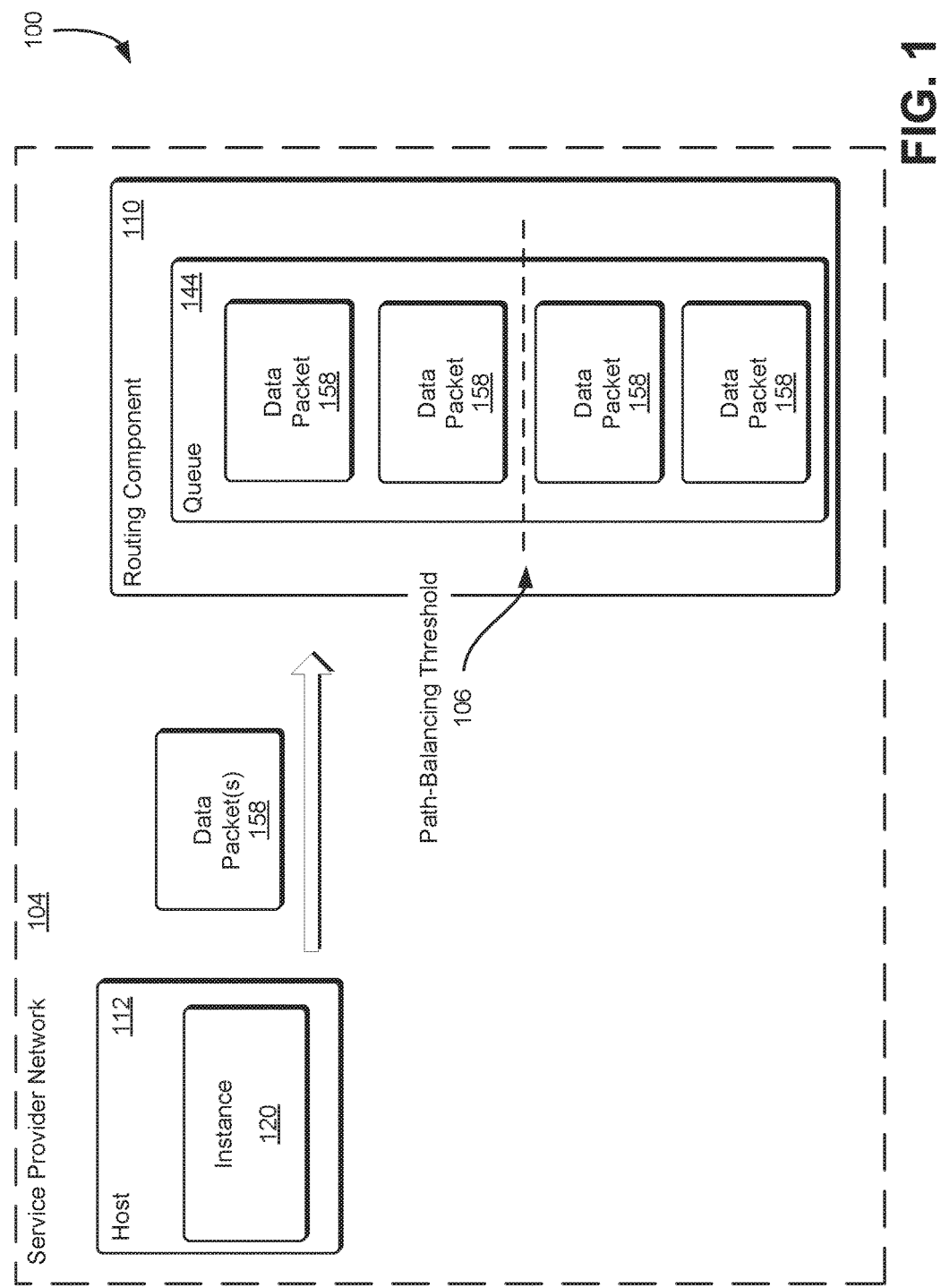
FIG. 1 illustrates an example of a system for measuring congestion on a service provider network in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested relate to congestion sensitive mechanisms for enabling path-balancing of network traffic between two endpoints of a service provider network. Path-balancing network traffic may cause the network traffic to be routed in such a way that the routing components of the service provider network distributes the network traffic of a particular transmission, described in greater detail below, among several different physical paths. For example, path-balancing may cause two packets of the same transmission to be routed along different paths of the service provider network. The network traffic may be part of a transmission between a destination computer instance and a source computer instance, described in greater detail below. The network traffic may travel across the service provider network which is configured to balance traffic across various components of the service provider network based at least in part on network congestion measured at the various components. Various methods and computing devices may be used to balance traffic on the service provider network, such as encapsulating packet traveling across the network such that two or more packets of a transmission follow different network paths. The encapsulation techniques described may help increase, for a given transmission between two endpoints within the service provider network, the utilization levels of multiple physical network paths available, and thereby help to improve the overall performance of computer systems being implemented using the service provider network's resources. The service provider network may be a network set up by an entity such as a company or other organization to provide one or more network-accessible services accessible via the Internet and/or other networks to a distributed set of users as described herein.

Various techniques may be used to measure congestion of the service provider network at various locations and/or devices within the service provider network. In various embodiments, the routing components of the service provider network are configured to mark any packet above a threshold in the routing component's queue. Marking the packet may include setting a particular flag or bit field in the header or other portion of the packet. The flag may be received by the destination physical host or virtualization layer of the physical host and a return packet may be marked with a similar flag (e.g., the same bit field in the header) and provided to the source physical host. Upon receipt of the return packet with the flag, the virtualization layer of the physical host may enable path-balancing for the transmission associated with the received return packet. Other methods for measuring congestion may be used in connection with the present disclosure. For example, the service provider may operate a congestion service configured to monitor congestion across the various components of the service provider network and determine whether to enable path-balancing for a given transmission. The congestion service may obtain congestion and/or load information from the various components of the service provider network. For example, the congestion service may obtain information from routing components indicating average and/or current length of the queue of packets waiting for transmission.

In various embodiments, network load generated by a computer instance may be measured and used to determine whether to enable path-balancing for a particular transmission. For example, if a computer instance is transmitting data at 10 Gbits per second, the service provider or component thereof, such as a virtual machine management service, may enable path-balancing for transmissions including the computer instance. In another example, if the aggregate bitrate for a set of computer instances operated by a user is above a threshold then path-balancing may be enabled for the set of computer instances. In various embodiments, if the service provider or component thereof determines to enable path-balancing for a computer instance and/or transmission, the service provider or component thereof may than determine whether to enable sequencing for the computer instance and/or transmission. For example, if network congestion as indicated by a routing component is above a threshold value, the source virtualization layer may enable path-balancing. The destination virtualization layer may then determine to enable sequencing for the transmission based at least in part on a selection provided by the user.

FIG. 1 illustrates a routing component 110 of a service provider network 104 configured to measure congestion of the service provider network 104 in accordance with an embodiment. Congestion of the service provider network 104 may include queuing of data packets 158 at any point along the service provider network 104, such as at a routing component 110. Congestion may also include an aggregated or average bitrate of data packets 158 transmitted by the host 112. Furthermore, congestion may be limited to a single path or subset of paths along the service provider network 104. For example, the service provider network 104 may include a plurality of routing components but the service provider network 104 may still be congested if routing component 110 has a queue 144 above the path-balancing threshold 106. In some embodiments, congestion occurs only when data packets 158 transmitted across the service provider network 104 are dropped and/or lost. The congestion may be measured on the service provider network 104 at various locations in the service provider network 104. For example, congestion may be measured at the routing component based at least in part on queue length. In another example, congestion may be measured at a physical host based at least in part on packet delay variance measure by the physical host 112. The physical host 112 may execute a computer instance 120; the physical host 112 and computer instance 120 are described in greater detail below in connection with FIG. 2. The computer instance 120 may execute an application on behalf of a user; the application may generate data for transmission over a network, such as the service provider network 104. The service provider network is described in greater detail below in connection with FIG. 3. The application may provide the data to a networking stack of the computer instance 120. The networking stack, described in greater detail below, may be configured to generate one or more data packets 158 including the data provided by the application and routing information indicating a destination for the data. In various embodiments, the data packets 158 are encapsulated (not shown in FIG. 1 for simplicity) in order to enable routing along the service provider network 104. Furthermore, the data packets 158 may be encapsulated in order to provide path-balancing for transmission between computer instances, described in greater detail below.

As the data packets 158 travel across the service provider network 104, the data packets 158 may be received at the routing component 110. The routing component 110 may include switches (e.g., intelligent switches equipped with routing functionality), routers, and/or various other types of networking devices described in greater detail below. Furthermore, the routing component 110 may be configured to provide congestion information to various other computing devices connected to the service provider network 104. For example, the routing component 110 may be configured to provide explicit congestion notification (ECN) to the destination virtualization layer. ECN may enable end-to-end notification of network congestion without requiring the destination virtualization layer to drop packets. ECN may be used between two ECN-enabled endpoints (e.g., virtualization layers of the physical host 112) when the underlying network infrastructure (e.g., routing components 110) also supports ECN. The routing component 110 may set a mark in the Internet Protocol (IP) header instead of dropping a packet in order to signal impending congestion. In various embodiments, the receiver of the packet echoes the congestion indication to the source physical host 112 or component thereof, such as the virtualization layer. In various embodiments, the receipt of mark IP header may cause the source virtualization layer to enable path-balancing.

As illustrated in FIG. 1, the routing component 110 may include a path-balancing threshold 106 configured to enable path-balancing for at least a portion of the traffic and/or transmission received by the routing component 110. For example, the path-balancing threshold 106 may be configured such that any packet above the path-balancing threshold 106 in the queue 144 of the routing component is marked using the above mentioned ECN. In yet another example, the routing component 110 may be configured to transmit a notification in response to a number of packets in the routing component's 110 queue 144 being above the path-balancing threshold 106. The routing component 110 may transmit the notification directly to the source virtualization layer and/or physical host 112 or to a congestion service operated by the service provider. The notification may indicate congestion at the routing component 110. Furthermore, the path-balancing threshold may be configured as a percentage of the total size of the queue 144 and/or a level of congestion at which the routing component may drop additional received packets.

In various embodiments, the routing component 110 may determine congestion based at least in part on load generated by the computer instance 120 and/or physical host 112. For example, the routing component 110 may determine an average bitrate over an interval of time for the computer instance 120 and/or the physical host 112. If the average bitrate is over the path-balancing threshold 106, the routing component may enable path-balancing for the computer instance 120 or other transmission received from the physical host 112. The routing component may enable path-balancing by transmitting a notification to the source virtualization layer indicating network congestion. Similarly, the physical host 112 may also measure congestion based at least in part on load generated by the computer instance 120, such as the average bitrate described above. If the physical host 112 determines there is network congestion, the physical host 112 may then enable path-balancing by transmitting a notification to the source virtualization layer indicating network congestion. The virtualization layer may then encapsulate traffic transmitted from the source, the encapsulation causing two or more packets of the transmission to travel different paths in the service provider network 104, described in greater detail below.

Figure 2:
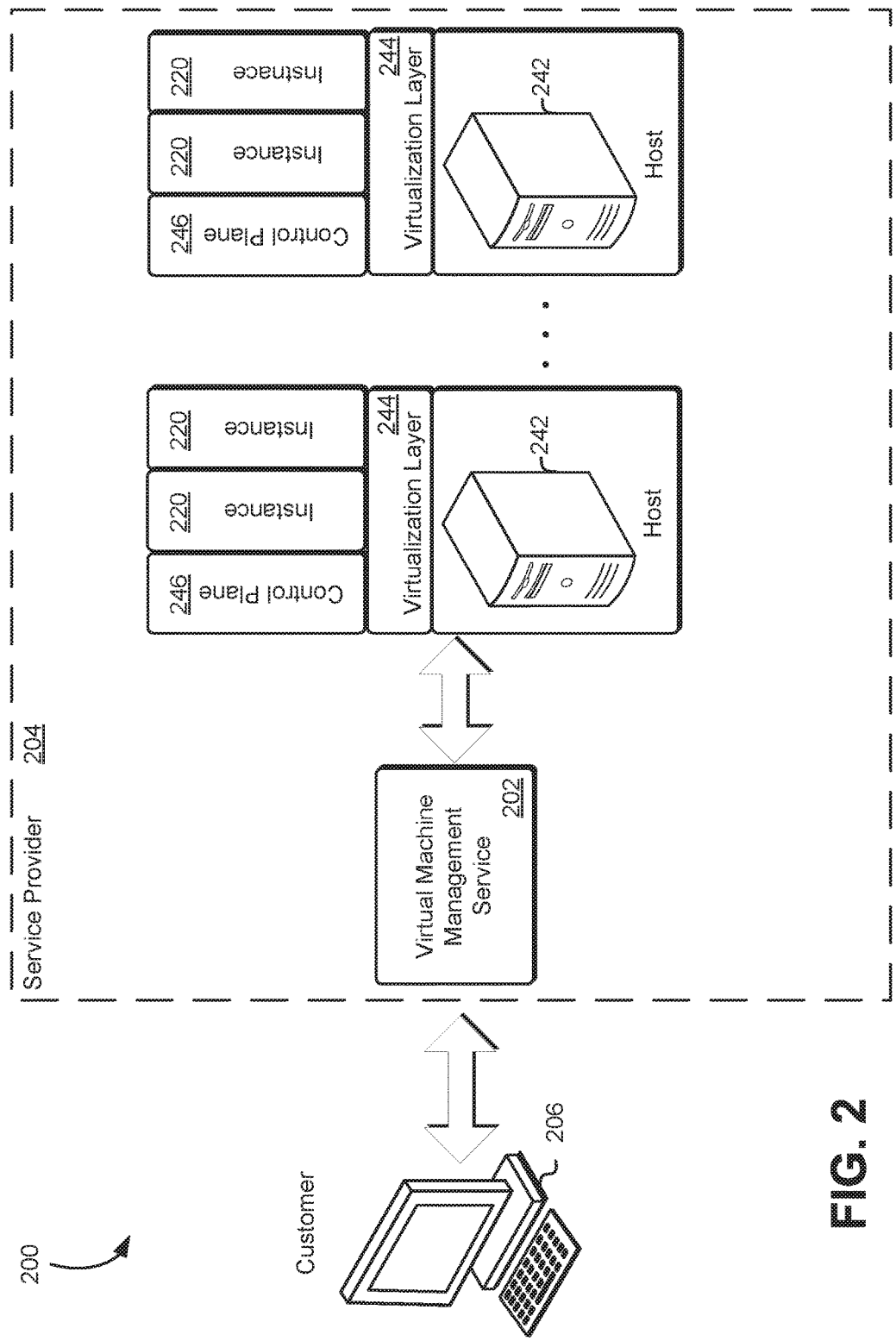
FIG. 2 illustrates an example of a virtual computer system service in accordance with an embodiment.

FIG. 2 illustrates a virtual computer system service in accordance with at least one embodiment. The virtual computer system service, which may be system hardware 240, is used by a service provider 204 to provide computation resources for customers. The system hardware 240 may include physical hosts 242. The physical hosts 242 may be any device or equipment configured to execute instructions for performing data computation, manipulation, or storage tasks, such as a computer or a server. A physical host 242 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The system hardware 240 may also include storage devices, such as storage disks and tapes, networking equipment, and the like.

A virtualization layer 244 executing on the physical host 242 enables the system hardware 240 to be used to provide computational resources upon which one or more computer instances 220 may operate. For example, the virtualization layer may enable a virtual machine 220 to access system hardware 240 on the physical host 242 through virtual device drivers on the virtual machine 220. The virtualization layer 244 may include a hypervisor or virtualization software and/or hardware. The virtualization layer may also include an instance of an operating system dedicated to administering the computer instances 220 running on the physical host 242. Each virtualization layer 244 may include its own networking software stack, responsible for communication with other virtualization layers 244 and, at least in some embodiments, also responsible for implementing network connectivity between the computer instances 220 running on the physical host 242 and other computer instances 220 running on other physical hosts 242. Furthermore, the physical host 242 may host multiple virtualization layers 244 of the same or different types on the same physical host 242. The virtualization layer 244 may be any device, software, or firmware used for providing a virtual computing platform for the computer instances 220. The virtual computing platform may include various virtual computer components, such as one or more virtual CPUs, virtual memory, and the like. The computer instances 220 may be provided to the users of the service provider 204 and the users may run an operating system or an application on the computer instances 220. Further, the service provider 204 may use one or more of its own computer instances 220 for executing its applications. At least a portion of the computer instances 220 may execute kernel-level components for one or more other computer instances 220. For example, a particular computer instance may execute a parent partition configured to manage one or more child partitions executed by other computer instance, where the particular computer instance and the other computer instances are supported by the same virtualization layer.

The control planes 246 may be a computer instance supported by the virtualization layer 244. Although one control plane 246 is shown in FIG. 2, multiple control planes 246 may be supported by a virtualization layer 244 in accordance with the present disclosure. The control planes 246 may execute various operations using virtual computer components provided by the virtualization layer 244. The control planes 246 may receive commands and other information from the virtual machine management service 202. The commands and other information may be included in an application programming interface (API) call from the virtual machine management service 202 to the control plane 246. The virtual machine management service 202 may enable the users 206 to manage and operate the computer instances 220.

For example, the user 206 may transmit a request to the virtual machine management service 202 to terminate all computer instances 220 operated by the user 206. The request may be an API call including information corresponding to the user 206 and computer instances 220. The virtual machine management service 202 may determine the corresponding control planes 246 for the computer instances 220 included in the request and transmit a terminate command to the control plane 246. The virtual machine management service 202 may be implemented in at least some embodiments, enabling a variety of client applications to run at virtual computer servers or computer instances 220 instantiated on behalf of the users 206. The computer instances 220 may each comprise a virtual machine, with its own operating system comprising a networking software stack, and multiple such instances may be hosted on a given physical host 242 at a service provider network data center.

Many applications executed on behalf of users may involve transmissions of large amounts of data between source and destination application components running on respective computer instances 220, often at different physical hosts 242. For example, a content management application or an online video application may need to transfer gigabytes of data between a source computer instance 220 running on a physical host 242 and a destination computer instance 220 running on a different physical host 242. A given physical host 242 may be configurable to accommodate multiple computer instances 220, several of which may be used for network-intensive applications simultaneously. In order to be able to handle large amounts of network traffic between computer instances 220 at different physical hosts 242, in at least some embodiments, dense multi-path, multi-layer interconnect topologies (such as "fat trees," VL2 (Virtual Layer 2) topologies, BCube topologies, or other topologies based on Clos networks) may be set up by provider network operators, described in greater detail below in connection with FIG. 3. Such interconnect topologies may support, for example, multiple tens of gigabits per second of peak available bandwidth between at least some pairs of physical hosts 242.

However, such dense topologies may not always result in optimal distribution of network traffic across the multiple paths available between sources and destinations, and in practice, underutilization of the available bandwidth may be observed. Some conventional routing techniques (such as various forms of ECMP or equal-cost multi-path routing) may rely, for example, on selecting the next hop for a given packet based on some set of header field values of the packet, such as the 5-tuple value of (source IP address, destination IP address, source port, destination port, protocol ID of the networking protocol in use). The values in the header fields may be used as input for a hash function, for example, and the output of the hash function may be used to select the next hop or link for the packet. For different TCP/IP (Transmission Control Protocol/Internet Protocol) connections, schemes that rely on selecting hops based on functions of header field values may succeed in distributing traffic across multiple paths, because some of the header field values would typically differ (e.g., a different IP address or port may be used for connection 1 than for connection 2). However, for a given TCP/IP connection, the 5-tuple header field values may be identical for all packets, and consequently, a routing technique that uses hashing or some similar technique on such header field values may always select the same hop for different packets of the connection. Often, some connections involve much greater amounts of data transfer than others; that is, data transfer amounts may not be uniformly distributed among different connections. As a result, some links of the dense, interconnected multi-path network may end up being much more heavily utilized than others. Additionally, encapsulation protocols may increase the utilization of certain links more than others in the interconnected multi-path network.

In order to improve the overall utilization of dense multi-path interconnected network, an encapsulating mechanism may be implemented. Such a mechanism may involve the instantiation of an encapsulating intermediary, e.g., at the virtualization layers 244 of the sending (and receiving) physical hosts 242. The encapsulating intermediary may receive or intercept packets generated by the networking stacks at the computer instances 220 at which the sending application component runs. Such received/intercepted packets may be considered baseline packets. The encapsulating intermediary may add specially constructed header field values to the baseline packets to form corresponding encapsulation packets. An encapsulation packet may thus be considered an outer packet or a containing packet for the corresponding baseline packet, and a baseline packet may be considered an inner or contained packet of the corresponding encapsulation packet. The added header field values may be determined in accordance with a path-balancing policy, e.g., in such a way that the routing components of the interconnected multi-path network end up distributing different encapsulation packets of the same transmission among several different physical paths. For example, in one embodiment, the virtualization layer 244 may add an IP header (e.g., with the IP address for the correct destination physical host 242) as well as one or more randomly selected User Datagram Protocol (UDP) header field values to a baseline TCP/IP packet to form an encapsulation packet. The added UDP header field values may include, for example, a randomly selected source port number and/or a randomly selected destination port number. When a routing component, such as a node of the interconnected multi-path network, receives an encapsulation packet, in at least some implementations, the routing component may analyze the contents of the UDP and IP headers in order to select the next hop along which the encapsulation packet is to be used. The routing component may analyze the outermost headers of the encapsulation packet, for example, and may regard the contained baseline TCP packet as the body of the packet. As the UDP header field values were randomly selected, different encapsulation packets for the same applications' TCP/IP connection may end up being directed along different paths, thereby distributing the data traffic for a single connection among multiple paths. It is noted that techniques other than random selection may be used for selecting the values of the added header fields in at least some embodiments, e.g., an algorithm that increments the UDP sender port value for every packet of a given transmission may be used in some embodiments, or a technique that determines the UDP header packet based on other factors such as contents of the TCP baseline packets may be used. In another example, the virtualization layer 244 may determine a new UDP port in response to congestion and or load on the interconnected multi-path network as opposed to determining a new UDP port for each packet. The distribution of the traffic among different physical paths may be accomplished using any of various techniques that generally assign different values to the added header fields for respective baseline packets in various embodiments.

At the receiving physical host 242, e.g., at the physical host 242 where the destination application component of the TCP/IP connection executes within one of the computer instances 220, an unpacking component of the virtualization layer 244 may be responsible for stripping the added header field values from the encapsulation packet to extract the baseline TCP/IP packet, and for passing on the baseline packet to the networking stack of the destination computer instance 220. In several embodiments, a single component of the virtualization layer 244 may be responsible for the encapsulating and unpacking functionality (e.g., such as an encapsulation/de-encapsulation intermediary, described in greater detail below). A given virtualization layer 244 may be responsible for adding header field values to outgoing packets, and extracting baseline packets from incoming packets. An encapsulating intermediary may be a component of the virtualization layer 244 or the physical host 242 that performs both the encapsulation and unpacking functions, depending on the direction of the traffic flow. For example, the encapsulating intermediary may be a software component of the virtualization layer 244 and may be provided to the virtualization layer 244 by the virtual machine management service 202. The user 206 may select various networking options (e.g., packet sequencing) for computer instances 220 operated by the user 206, the virtual machine management service 202 may then provide the virtualization layer 244 associated with the computer instances 202 with information sufficient to enable the networking options selected by the user 206.

In at least some embodiments, in addition to ensuring that multiple paths are used for different packets of a given transmission and that the packets are routed to the correct destination physical host 242, the encapsulating intermediary may be configurable to perform additional functions. For example, in at least one embodiment in which encapsulation involves using headers of a protocol such as UDP that does not guarantee in-order delivery of packets, the encapsulating intermediary may also generate a sequence number to be added to a baseline packet to form an encapsulation packet. At the receiving end, when the encapsulation packets are unpacked, the encapsulating intermediary may make a best-effort attempt to use the sequence numbers to deliver the corresponding baseline packets in order to the receiving computer instance's networking stack. Thus, in some embodiments, from the application perspective, a TCP/IP connection that guarantees in-order delivery may be set up between the source computer instance 220 and the destination computer instance 220 at respective physical hosts 242. The encapsulating and/or de-encapsulating mechanism may make it appear to the routing components of the interconnected multi-path network as though a set of UDP packets (e.g., with different UDP port numbers for different packets) is being transmitted, rather than a set of TCP packets. At the receiving physical host's 242 visualization layer 244, the encapsulating intermediary may, in some embodiments, store the encapsulation packets temporarily in a buffer to help with in-order delivery, described in greater detail below. The encapsulating intermediary may, in some embodiments, use the sequence numbers added by the sending encapsulation intermediary to attempt to deliver the baseline TCP/IP packets to the destination computer instance 220 in the correct sequence (i.e., in the same sequence in which the TCP/IP packets were sent by the source computer instance). In some embodiments, depending on the size of the buffer and/or on real-time traffic conditions, the encapsulating intermediary may not be able to deliver all the extracted baseline packets in order. In such a scenario, the networking stack of the destination computer instance 220 may request retransmissions of the missing packets using the standard procedures used for the networking protocol in use between the source and destination instance network stacks (e.g., either by an explicit retransmission request or implicitly, by not sending acknowledgements for the missing packets, which would lead the sending networking stack to retransmit the undelivered packets). In some embodiments, the sequence number added by the encapsulating intermediary may be determined based at least in part on a sequence number already incorporated within the baseline packet (e.g., if the baseline packet is a TCP packet, the TCP packet's sequence number, originally set at the networking stack of the source computer instance, may be used to derive the sequence number added by the encapsulating intermediary).

In some embodiments, the operating systems in use at the source and destination computer instances 220 may support large ("jumbo") packet sizes or frame sizes. In such embodiments, the encapsulation intermediary may be configured to break up into smaller pieces a given jumbo baseline packet generated by the source computer instances, such that several different encapsulation packets are transmitted corresponding to a single jumbo baseline packet. Similarly, at the receiving side, the encapsulating intermediary may be configured in some such embodiments to combine the pieces of a given baseline jumbo packet before passing on the packet to the networking stack at the destination computer instance 220. The encapsulation intermediary may combine multiple different baseline packets generated by one or more source computer instances 220 on the same physical host 242 and destined for one or more computer instances 220 on the same destination physical host 242 into a single encapsulation packet, such that several different baseline packets are transmitted in a single encapsulation packet. At the receiving side, the encapsulating intermediary may be configured to unpack the multiple baseline packets and pass them to the respective networking stack(s) for the destination computer instance(s) 220.

In at least some embodiments, path-balancing using encapsulation may not be implemented for all the network transmissions from or to a given application component, for all the network transmissions from or to a given computer instance, or for all the packets transmitted between a given pair of hosts. Instead, the encapsulation intermediary may determine, based on any of several factors, whether path-balancing is to be used for a given set of packets, e.g., for a given TCP/IP connection or for packets belonging to several different TCP/IP connections. Such factors may include, for example, an expected amount of data to be transferred, the identity of the sending or receiving client (e.g., path-balancing may be applied to data transfers of some clients, but not others, based on the expected volumes of data transfers of the clients or based on contractual relationships established with the clients), the one or more attributes of the application involved in the transfer, an estimate of the number of alternative paths available between the source and destination, load along one or more network paths, network congestion as measured at one or more intermediary routing components of the network, network congestion measured at a central computer system monitoring congestion on one or more intermediary routing components of the network, or an estimate of the number of hops or links involved in the data transfer.

In some embodiments, path-balancing may be implemented at the user's 206 request, e.g., a user 206 may submit a balancing request indicating that the maximum amount of parallelism possible be used for the client's data transfers. In some embodiments, the determination as to whether to use path-balancing and or packet sequencing may be made based at least in part on one or more attributes of the user 206 or the user's 206 computer instances 220. The one or more attributes may include budget limits (e.g., users may be charged more for path-balanced data transfers, and a given client interested in optimized data transfers may be able to designate a budget to be used for path-balanced transfers), average bitrate for the computer instances 220 operated by the user 206, average amount of data transferred per interval of time for at least one computer instance 220 operated by the user 206, an aggregate amount of data transferred by the user's 206 computer instances 220, or one or more user account settings selected by the user 206 through a management console of the virtual machine management service 202. In various embodiments, the encapsulation mechanism will stop using path-balancing techniques for the user 206, once the designated budget is exhausted.

A path-balancing policy may include the factors to be considered in determining whether path-balancing is to be attempted, as well as the logic to be used to determine values of fields to be added to baseline packets in the cases where path-balancing is used. For example, the virtual machine management service 202 or other service of the service provider 204 may determine if path-balancing is enabled, and whether to enable packet sequencing so that the destination computer instance(s) 220 receives the baseline packets in order. In some embodiments, several different path-balancing policies may be implemented, e.g., different policies may be applied for different client categories, different application categories, or different data centers of the service provider network. It is noted that at least in some embodiments, even if a decision to attempt path-balancing is made for a transmission, it may not be the case that the traffic of that transmission is necessarily uniformly distributed across all the available paths. Such a scenario may result due to any of several factors, for example, because routing components may estimate different costs for some of the alternative paths and select some paths in preference to others based on cost, or because the header field values added by the encapsulation mechanism do not happen to lead to a uniform distribution.

It is noted that an encapsulation intermediary may be used for purposes not directly related to path-balancing in at least some embodiments. In some such embodiments, for example, in which virtualized networking is supported, arbitrary client-selected network addresses, which may be unrelated to the IP addresses associated with the physical host's 242 virtualization layer 244, may be assigned to various computer instances 220 at a given physical host 242. In order to direct client traffic to the appropriate destination computer instances 220, the virtualization layers 244 at the physical hosts 242 may be configured to add some set of network headers (e.g., IP headers with the IP addresses of the destination physical hosts 242) to the baseline packets regardless of whether path-balancing techniques similar to those described herein are being used. Furthermore, additional encapsulation fields may be added to the baseline packets, e.g., fields that identify the user(s) 206 on whose behalf data is being transmitted, which may be used for billing purposes or monitoring purposes.

As described above, in some embodiments, the encapsulation intermediary on the sending side of a transmission may be implemented at the same physical host 242 (e.g., within a virtualization layer 244 at the same physical host 242) as the application component whose data is being transmitted. In other embodiments, however, an encapsulation intermediary may be implemented at a different device than the physical host 242 at which the source application runs, for example, at one or more routing components of the interconnected multi-path network. Similarly, the encapsulation intermediary on the receiving side of the transmission may be implemented at a different device (such as an interconnect device) than the physical host 242 at which the receiving application runs. In various embodiments, the source and/or destination applications execute on a non-virtualized compute server, (e.g., on a physical server that does not have a virtualization layer 244 installed.)

The encapsulation fields (e.g., the fields added to the baseline packets for the purpose of path-balancing) may not necessarily correspond to headers for networking protocols of the Internet protocol suite. For example, if the routing components of the interconnected multi-path network are capable of parsing other types of fields than TCP, UDP, or IP header fields, and using such other fields for routing decisions, values may be generated for such other types of fields by the encapsulating intermediary of the virtualization layer 244. In some embodiments, other networking protocols (e.g., protocols other than TCP, UDP or IP) are used for path-balancing and/or more generally for transmissions between source and destination application components of the service provider network. Path-balancing techniques similar to those described above may also be employed even if either the source application component, or the destination application component, is being implemented outside the service provider network, (e.g., in a user data center at which equivalents of the encapsulation intermediaries have been installed at one or more devices.)

Figure 3:
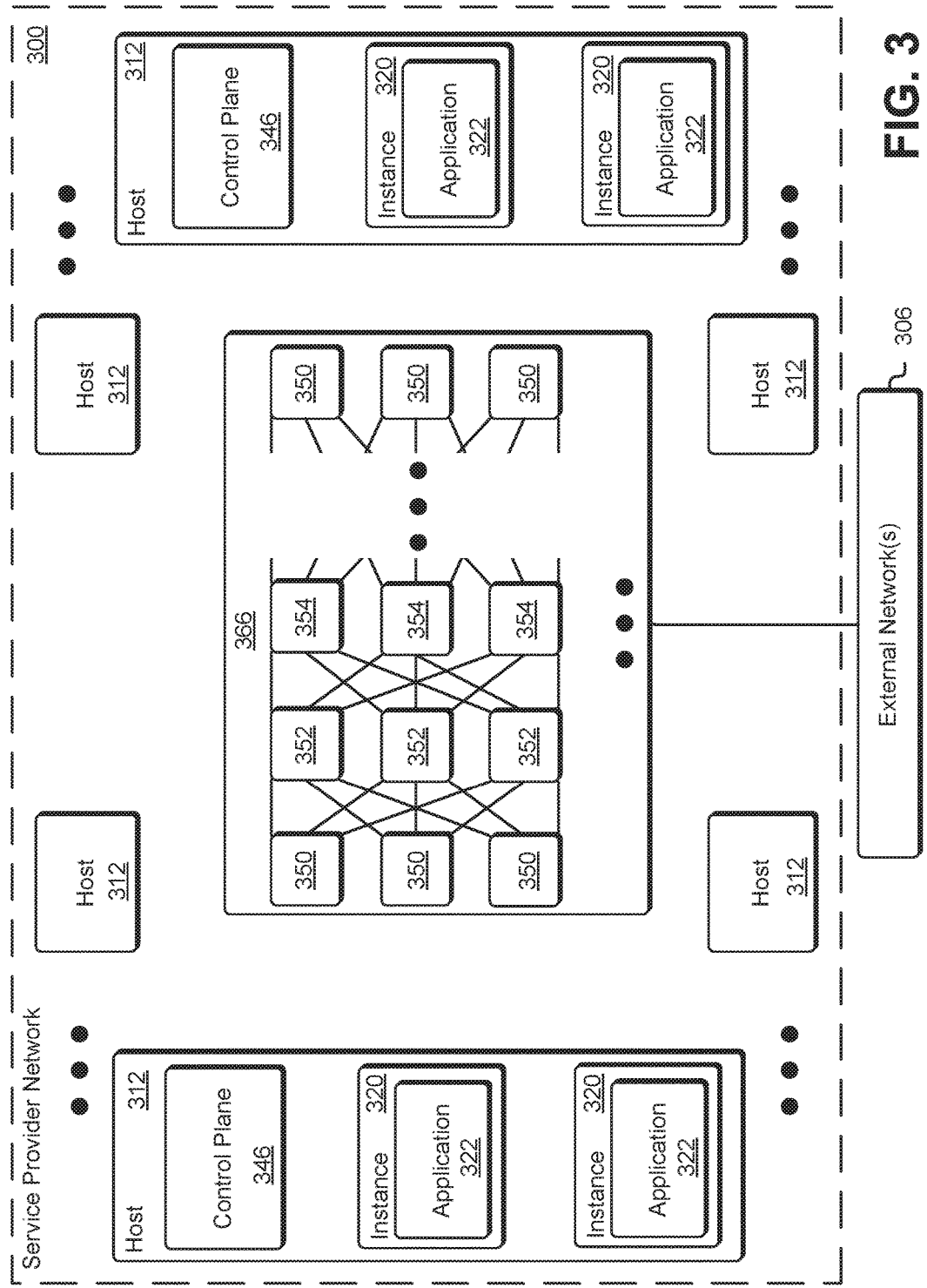
FIG. 3 illustrates an example of a system in which virtualization hosts of a service provider network are linked by a dense, multi-layer, multi-path interconnected network in accordance with an embodiment.

FIG. 3 illustrates an example of a service provider network 300 in which physical hosts of the service provider network 300 are linked by a dense, multi-layer, multi-path interconnected network 366, according to at least some embodiments. As shown, the service provider network 300 comprises a plurality of hosts 312 used for implementing virtual computer instances 320. The hosts 312 may include any of the computing devices, processes, hardware modules, or software modules that are owned by, managed by, or allocated to, an entity (such as an organization, a group with multiple users or a single user) that is capable of accessing and utilizing at least one network-accessible service of the service provider network 300, such as the physical hosts described above in connection with FIG. 2. A given service provider network 300 may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network.

As shown, at least some subset of the hosts 312 may be linked via a dense, multi-path, multi-layer internal interconnected network 366 that includes a plurality of different physical paths between pairs of hosts 312. As illustrated in FIG. 3, the dense interconnected network 366 is shown as comprising a number of distinct layers, including outer layers (i.e., layers directly connected to hosts 312) comprising interconnect nodes 350, and inner layers (not directly connected to hosts 312) comprising a different class of interconnect nodes 352 and 354. The outer layer nodes 350 may differ from the inner layer nodes 352 and 354, such as the physical arrangement of the nodes (e.g., outer layer nodes 350 may be arranged in racks physically close to the racks at which hosts 312 are housed), the number of nodes per rack, the number of distinct in and/or out ports at each node, the performance capabilities (e.g., bandwidth and/or latency) of the physical links leading into and/or out of the nodes, and so on. In some embodiments, the outer layer nodes are referred to as "bricks," and the inner layers are referred to collectively as a "fabric." Furthermore, at least a portion of the outer layer nodes 350 may be included as a component of the host 312. In other embodiments, nodes used for various interconnected layers may have similar capabilities, e.g., each of the nodes of the interconnected network 366 may be identical. Various different types of topologies may be used for the dense interconnect in different embodiments, such as fat trees, VL2 topologies, BCubes, high radix network fabric topologies, or various other types of topologies based on Clos networks. The interconnect nodes 350, 352, and/or 354 may comprise, for example, switches (e.g., intelligent switches equipped with routing functionality), routers, and/or various other types of networking devices in different embodiments. In at least some embodiments, the interconnected nodes 350, 352, and/or 354 may comprise inexpensive commodity hardware and/or software components.

As illustrated in FIG. 3, at least a subset of the hosts 312 may comprise a respective virtualization layer. The virtualization layer at a given host 312 may include, for example, a hypervisor and/or a special instance of an operating system that is designated for administrative uses, such as a control plane 346 described above in connection with FIG. 2 (as opposed to operating system instances at computer instances being used for user applications). Each host with a virtualization layer may be capable of instantiating one or more computer instances 320. Each such instance 220 may include a respective instance of an operating system, including a networking stack for one or more network protocols such as TCP, UDP and IP protocols of the Internet suite. Each instance 320 may be allocated to a respective user, e.g., for use for one or more applications 322 or application components.

Network traffic between the applications 322 running at different instances 320 may take the following general path as depicted in FIG. 3. The source application's 322 data may be organized into baseline packets at the source instance's networking stack, with each baseline packet including a body (the application data, or a portion thereof) and a set of headers (depending on the specific networking protocols being used for the transmission). Any appropriate network protocol may be used for a given network transmission, which may comprise a sequence of packets sent from a source application 322 or application component to a destination application 322 or application component. For example, a connection-oriented protocol such as TCP may be used for a network transfer between application components, or a connectionless protocol such as UDP may be used. The baseline packets may be passed, e.g., via virtual network interfaces, to the virtualization layer at the source host 312.

In some embodiments, the virtualization layer may comprise one or more subcomponents responsible for determining, based at least in part on criteria of a path-balancing policy or sequencing policy in use, whether a path-balancing technique and/or sequencing technique is to be employed for a given network transmission between a source computer instance 320 and destination computer instance 320. At least for those network transmissions for which path-balancing is to be implemented, an encapsulation intermediary component at the virtualization layer may add one or more data fields, such as UDP and/or IP header fields to a baseline packet to generate an encapsulation packet. Furthermore, at least for those network transmissions for which sequencing is to be implemented, an encapsulation intermediary component at the virtualization layer and/or the source instance's networking stack may add one or more data fields, such as a sequencing flag and sequence number. In the case of a network transfer for which a TCP connection was established between the source and destination, for example, and one or more UDP headers were added during encapsulation, the encapsulation packet may appear to be a UDP packet whose body contents happen to include a complete TCP packet (with its own headers). In the case of a network transfer for which UDP was used at the source computer instance 320, a new set of UDP headers may be added for encapsulation, so that the encapsulation packet may include two sets of UDP headers—one set added by the encapsulating intermediary of the virtualization layer, and one set generated at the source computer instance 320. The encapsulating intermediary may select values for the added header fields in accordance with the path-balancing policy, such that routing components involved in selecting hops or links for the encapsulation packets select different hops for different encapsulation packets corresponding to a single transmission. For example, in one embodiment, if the network transmission is between source application 322 of instance 320 at host 312 and destination application 320 at instance 320 of host 312, randomly-selected UDP source port numbers may be added as encapsulated field values by virtualization layer, so that nodes 350, 352, and/or 354 of the interconnected network 366 transmit successive encapsulation packets of the transmission along different combinations of physical links (e.g., along paths selected based on a hash value obtained at least in part from the added random header values). The local routing decisions within various interconnected layers may thus be based on the added-on field values, without necessarily having to change routing logic of the interconnected components. At the same time, an IP header also added by the encapsulating intermediary may have the correct IP address of the destination host's virtualization layer, so that the encapsulation packets ultimately (at least in the absence of packet loss) reach the correct destination host.

Once an encapsulation packet reaches the destination host's 312 virtualization layer, an encapsulating intermediary may extract the baseline packet from the encapsulation packet (e.g., by stripping the added fields) and pass on the baseline packet to the networking stack at the computer instance 320 at which the destination application 322 runs. It is noted that although, for ease of explanation, unidirectional network traffic has been discussed herein, similar techniques may be used in either direction for bi-directional traffic in at least some embodiments, with the roles of the source and destination elements reversed for different subsets of the bi-directional traffic. In some embodiments, the source and destination applications rely on in-order delivery of the baseline packets (as in the case of TCP connections), while the encapsulation headers correspond to a protocol such as UDP that does not guarantee in-order delivery, sequence numbers may be added as part of the encapsulation procedure. Furthermore, the sequence numbers may be added as a result of a setting or selection made by a user, as described above. For example, the user may select an operating system to be executed by the computer instance 320 that is able to manage out-of-order packet delivery and therefore the virtual machine management service may configure the source computer instance 320 to transmit packets without sequencing information in the baseline packets or the encapsulation headers. In yet another example, the user may select an option for the user's computer instances 320, such that if a path-balancing policy is implemented for transmission of the computer instances 320 then sequencing information is to be added to the baseline packets and/or the encapsulation headers for transmission to the computer instances 320 and/or from the computer instances 320.

The encapsulating intermediary at the destination virtualization layer may receive an encapsulation packet out of order. The destination virtualization layer may therefore buffer one or more encapsulation packets, at least for a predetermined time interval, in an attempt to provide the extracted baseline packets to the destination computer instance 320 in the expected order. If the missing encapsulation packets are not received in the time interval, one or more baseline packets may nevertheless be delivered out of order to the destination instance 320 and the networking stack at the destination instance 320 may take the appropriate steps in response to the out-of-order delivery (e.g., by not sending acknowledgements for the missing packets, or by requesting retransmissions of the missing packets, per the network protocol being used). It is noted that from the perspective of source application 322 and destination applications 322, source computer instance 320 and destination computer instances 320, and the interconnected nodes 350, 352, and/or 354, no changes may be required for path-balancing to be implemented in the depicted embodiment.

In the embodiment shown in FIG. 3, network transfers within the service provider network 300, i.e., between different hosts 312, may be completed using the dense interconnected network 366. Network transmissions to/from other destinations outside the provider network may involve the use of external networks 306, e.g., via additional links between the internal interconnected network 366 and the external networks. In some embodiments, the use of encapsulation-based path-balancing techniques is limited to transfers for which both the source and destination are within the service provider network 300. A destination within the provider network may not be a final destination. For example, a destination may be an edge device of interconnected network 366 for sending network traffic out to an external network 306. The encapsulation-based path-balancing techniques as described herein may be employed between a source and an edge device within the service provider network 300, but the added encapsulation may be removed once the traffic is sent to the external network 306. Dense multi-path interconnected networks may be in use at several different data centers of the service provider network 300 and path-balancing may be used to try to increase bandwidth utilization of the interconnected networks even if the source and destination are at different data centers (i.e., even if some of the links involved in the transmission do not form part of a dense interconnected network 366, such as when the traffic flows over an external network 306 between two data centers of the service provider). In at least some embodiments, encapsulation-based path-balancing is employed even if either the source, the destination, or both the source and destination are outside the service provider network 300. For example an encapsulating/de-encapsulating module may be provided for installation at devices within user networks, so that path-balancing of the kind described here is enabled even if a source or destination lies within a user network rather than the service provider network 300. It is noted that although the virtualization layers of FIG. 3 include the encapsulating intermediary, similar encapsulating and de-encapsulating functionality may be implemented using software and/or hardware other than virtualization layers components in at least some embodiments. In various embodiments, each host 312 has two links to the outer layer nodes 350 of the interconnected network 366, although a different number of links may be used in other embodiments. In at least some embodiments in which multiple links are available between hosts and a dense interconnected network 366, the encapsulating intermediaries may balance traffic corresponding to a given network transmission among the host-to-interconnect links as well, e.g., using random or round-robin selection. Path-balancing policies may not necessarily be implemented for all the packets of a given network transmission. For example, traffic may flow over a long-lasting TCP connection for days or weeks, and network conditions may change in such a way during that period that it may not always be advisable to attempt path-balancing for all packets. Path-balancing may be switched on and off as needed during the lifetime of the network transmission, depending, for example, on criteria specified in the path-balancing policies in use and/or one or more setting of a user account corresponding to the flow.

Figure 4:
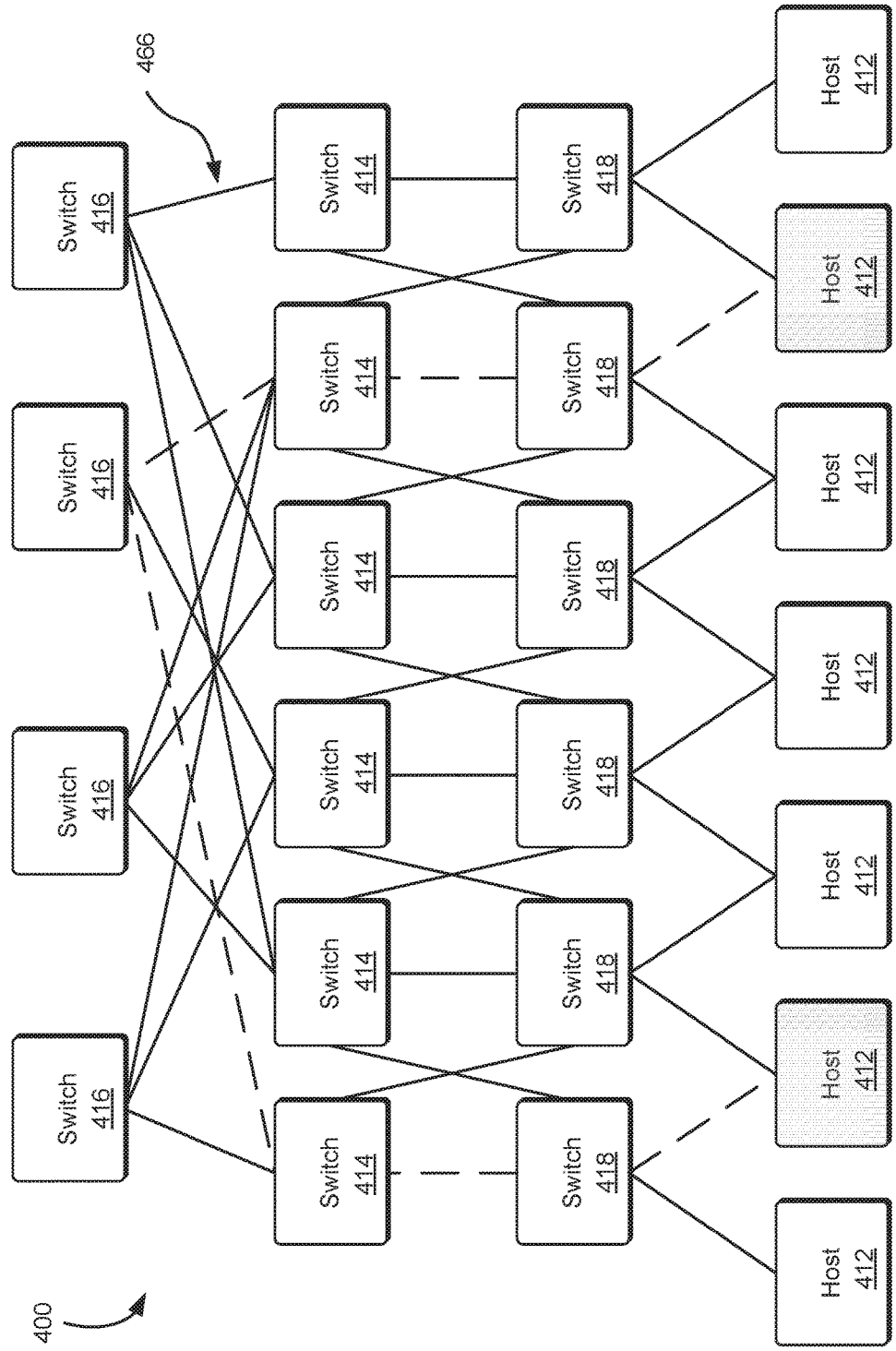
FIG. 4 illustrates examples of alternate network paths available between a pair of virtualization hosts connected by a fat-tree interconnect in accordance with an embodiment.

As described above, a number of different types of dense, multi-path interconnected network topologies may be used in different embodiments, including fat trees, VL2 topologies, BCube topologies, and the like. By way of example, FIG. 4 illustrates a system 400 in which alternate network paths available between a pair of hosts 412 connected by a fat-tree interconnect 466, according to at least some embodiments. In the depicted embodiment, hosts 412 are each linked to a first layer ("Tier-1") of switches 418. Switches 418 of the first layer are each linked to two hosts 412 and to two second-layer ("Tier-2") switches 414. Each second-layer switch 414 is in turn linked to two third-layer ("Tier-3") switches 416. Each third-layer switch 416 may be linked to three different second-layer switches 414. It is noted that, for clarity, FIG. 4 shows a much-simplified example, and that in many practical large-scale implementations the link fan-out between different switch layers (e.g., 418, 414, and/or 416) and/or between the switches and the hosts 412 may be much higher than that shown in FIG. 4; the number of layers or tiers may also be higher. Each of the links shown in FIG. 4 may support bandwidths of several gigabits/second (e.g., 10 Gbits/second).

Several different physical network paths are available for traffic between source host 412 and destination host 412 as illustrated in FIG. 4. One such path is illustrated in FIG. 2 as a dashed line between two hosts 412. As the number of layers and/or the link fan-out increases, many more alternative paths may be possible between a given pair of hosts 412 connected via such dense interconnected networks. In at least some embodiments, at least some of the interconnect nodes such as Tier-1, Tier-2 or Tier-3 switches 418, 414, or 416 may be configured to select the next link to be used for a given packet based on the contents of packet headers that they can parse, and/or based on estimates of the costs of using each of the available links. The routing-related costs of different links between the interconnected nodes may typically be determined to be equivalent. If all the links available are deemed to be of equivalent cost, link selection may be based primarily on packet header contents. Different types of packet headers may be used for link selection in different embodiments, for example, headers comprising source and destination port numbers, source and destination IP addresses, protocol identifiers, or other types of header fields. By inserting different header field values for different encapsulation packets of the same transmission (e.g., different packets for the same TCP connection), the traffic may be distributed uniformly or nearly uniformly among the alternative paths. The extent of the overall uniformity achieved and the overall improvement in average interconnected link utilization levels may vary depending on the mechanisms used for determining the header field values (e.g., the extent to which the added header field values are themselves uniformly distributed), relative timings and sizes of different transmissions, and/or other factors.

Figure 5:
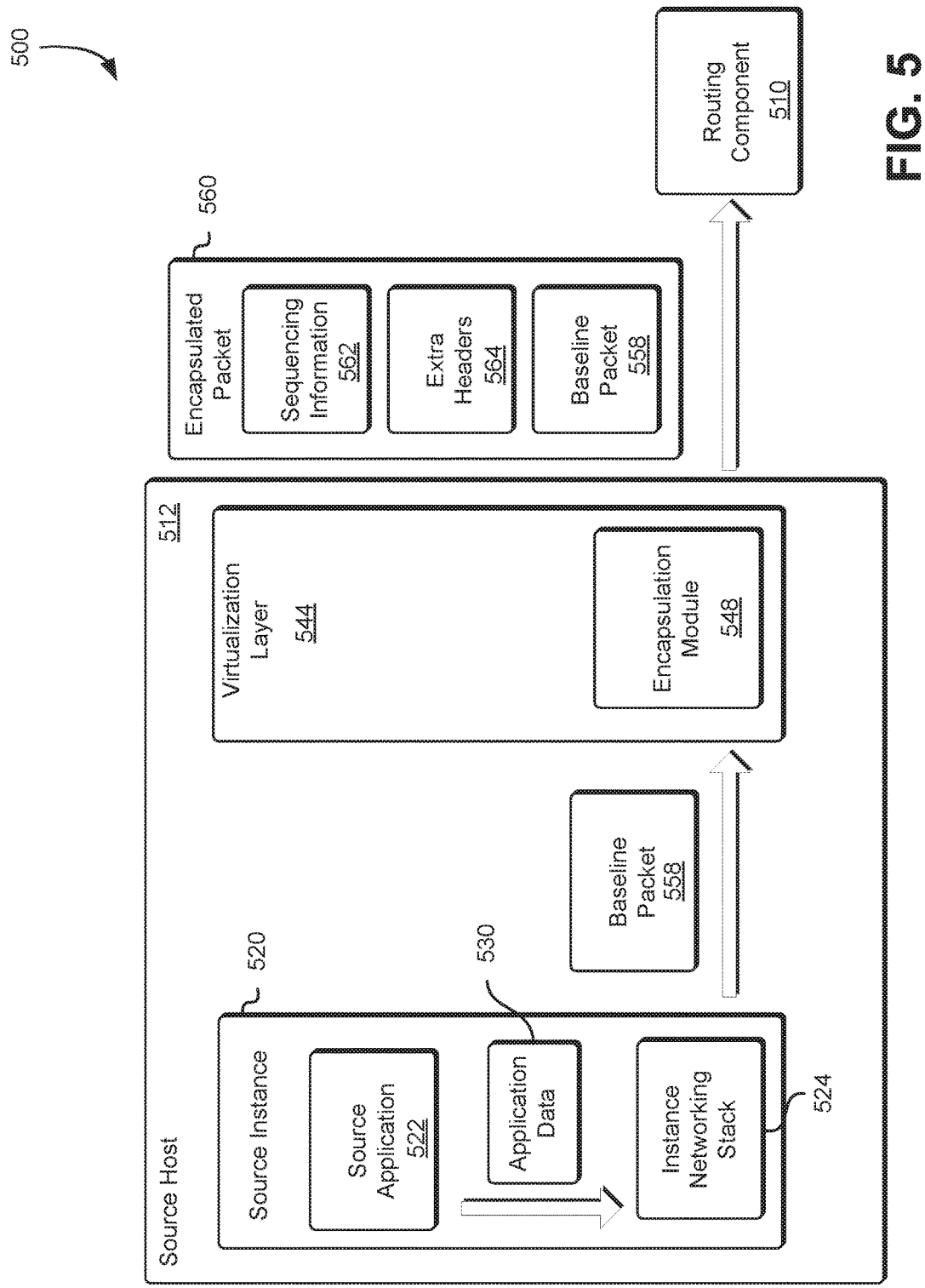
FIG. 5 illustrates an example of components that may participate in an encapsulation technique at a network transmission source in an attempt to distribute network traffic across multiple physical paths in accordance with an embodiment.

FIG. 5 illustrates a system 500 including examples of components that may participate in an encapsulation technique at a network transmission source in an attempt to distribute network traffic across multiple physical paths, according to at least some embodiments. As shown, source host 512 may comprise a source instance 520 and a virtualization layer 544. A source application 522 may be executed at the instance 520. The virtualization layer 544 may include an encapsulation module 548. In some embodiments, a connection-oriented protocol such as TCP is used between the source and destination application level components involved. A TCP connection may first have to be established with a destination instance, e.g., using one or more system calls similar to the socket( ) bind( ) listen( ) accept( ) and/or connect( ) system calls supported in various implementations of the Internet protocol suite's TCP protocol. In other embodiments, a connectionless protocol such as UDP may be used, which may involve the use of a different sequence of system calls.

When data is to be transferred from the source application 522 to some other application component located at the different instance, application data payload 530 (e.g., the data to be transferred at the application-to-application level) may be passed to instance networking stack 524 (which may be part of an operating system in use for computer instance 520) at source host 512. The instance networking stack 524 may, in some embodiments, depending on the size of the application data payload 530 and/or the packet size limits of the protocol in use, partition the application payload 530 into smaller pieces such that each of the pieces can be included within a respective baseline packet 558. The application data component may form the body of the baseline packet 558, and a set of headers (such as a TCP header and an IP header, in the case where a TCP connection is being used) generated by the instance networking stack 524 may be included in the baseline packet 558. Headers corresponding to different combinations of layers of the protocol being used may be incorporated within the baseline packet 558 by the instance networking stack 524. For example, if the OBI (Open Systems Interconnect) model is used, a data link layer header may also be included in the baseline packet 558, in addition to a transport layer (e.g., TCP) header and a network layer (e.g., IP) header.

The baseline packet 558 may be transmitted towards the destination computer instance by the instance networking stack 524 over a network interface accessible from computer instance 320. The networking interface may comprise a virtual interface set up by virtualization layer 544, such that the baseline packet 558 can be intercepted or received by the encapsulating module 548. The encapsulating module 548 may be configured to make several types of decisions regarding the baseline packets 558 of a given transmission. For example, the encapsulating module 548 may determine whether path-balancing is to be attempted for the transmission, based on factors such as one or more attributed of the user on whose behalf the data transfer is being performed, an indication of the number of alternate paths available to the destination, the approximate number of hops involved, budget limits, or based on client requests or client settings. For example, if the aggregated bitrate of all the computer instances associated with the user is above a threshold, path-balancing may be enabled for the transmission. Furthermore, if the user has enabled sequencing for transmission to the user's computer instances, the encapsulating module 548 may add sequencing information to the baseline packet 558.

If path-balancing is to be implemented, the encapsulating module 548 may then determine one or more values are to be added to the baseline packets 558 (in accordance with the path-balancing policy in use) to generate the corresponding encapsulation packets 560. For example, the encapsulating module 548 may determine whether UDP source or destination port numbers are to be added, whether sequence numbers are to be added so that an attempt to deliver baseline packets in order can be made at the destination, or whether other fields are to be added. For each type of field for which a value is to be added, the encapsulating module 548 may further be configured to determine the specific value to be added for each given baseline packet 558. For example, a UDP source port number and a sequence number is to be added, the source port number may be selected at random from a range of allowed source port numbers, and the sequence number may be determined based on either a counter maintained per transmission by the encapsulating module 548, or derived from a sequence number already included in the baseline packet 558 (e.g., a TCP sequence number). In some embodiments, the encapsulating module 548 is also configured to add additional fields (e.g., an IP header) or values that may be required to ensure that the encapsulation packet 560 reaches the correct destination host via the interconnected network. As illustrated in FIG. 5, the encapsulation packet 560 includes the baseline packet 558 as its body, a set of extra headers 564 added for path-balancing and perhaps other purposes, and sequencing information 562. The sequencing information 562 may be included in the set of extra headers 564 or may be included in a separate set of headers. The encapsulation packet 560 may then be transmitted to the dense multi-path interconnected network, where a routing component 510 may be configured to interpret the values added by the encapsulating module 548 to determine at least a portion of the route (e.g., one or more interconnect links) to be used for the encapsulation packet 560. Depending on the techniques used to determine the added field values, different encapsulation packets 560 of the same transmission may have different field values, and hence different network links selected for their transmission towards the destination hosts.

Figure 6:
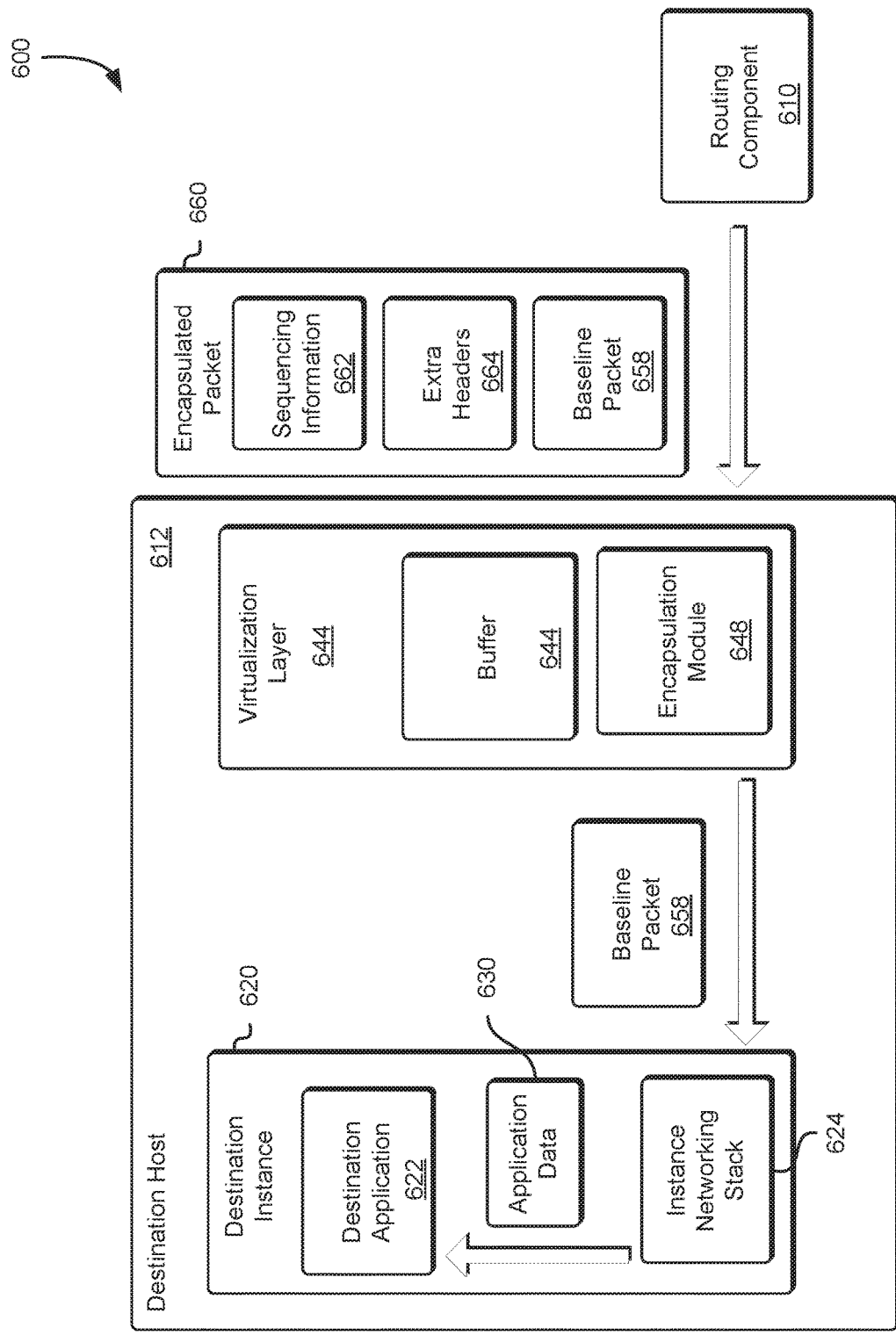
FIG. 6 illustrates examples of components at a destination of a network transmission that may participate in unpacking packets to which fields were added to distribute network traffic across multiple paths in accordance with an embodiment.

FIG. 6 illustrates a system 600 which includes examples of components at a destination of a network transmission that may participate in de-encapsulation of packets to which fields were added to distribute network traffic across multiple paths, according to at least some embodiments. As shown, an encapsulation packet 660 may comprise a baseline packet 658 and a set of extra headers 664 added by the encapsulating module at a source virtualization layer, and at least some sequencing information 662. The encapsulation packet 660 may be received at an encapsulating module 648 of a destination virtualization layer 644 at host 612 from an interconnected node 610. The receiving encapsulating module 648 may be responsible for extracting the baseline packet 658 from the encapsulation packet 660, e.g., by parsing the encapsulation packet and stripping the extra headers 664. Depending on whether in-order delivery of baseline packets 658 is required at the destination and on whether the encapsulation packets are delivered out of order to the encapsulating module 648, some number of the received encapsulation packets may be stored temporarily in a buffer 646 by the encapsulating module 648. A time out may be used to determine how long the encapsulating module 648 buffers a given encapsulation packet received out of order, before the encapsulating module 648 determines the baseline packet 658 may be lost, and passes on the out-of-order baseline packet 658 to an instance networking stack 624 at a destination instance 620. In some embodiments, the encapsulating module 648 may not transfer a baseline packet to the instance networking stack 624 unless all previous packets have been transferred in order. Furthermore, the encapsulating module 648 may simply drop some packets if delivery order cannot be maintained.

The virtualization layer 644 may also reassemble jumbo packets into the baseline packet 658 before providing the baseline packet to the instance network stack 624. Furthermore, the virtualization layer 644 may be configurable such that the time out duration packets stored in the buffer may be adjusted. For example, the user may transmit an API call to the computing resource service provider indicating a time out duration for one or more computer system instances operated by the user. In another example, the destination instance 620 may be configured to determine a time out duration based at least in part on the performance of the destination application 622. The virtual machine management service, described above, may be configured to set the time out duration during initialization of the destination instance 620 based at least in part on an image of the destination instance 620 and/or one or more settings of the destination instance 620. Additionally the time out duration may be modified during execution of the destination application 622. For example, the control plane, described above, or other component of the computing resource service provider may determine to increase or decrease the time out duration based at least in part on various attributes of the destination instance 620, source instance, or dense multipath interconnected network. For example, if the destination application 622 or other component of the destination host detects packet delay variation the time out duration may be adjusted. Packet delay variation may include any detected difference in end-to-end (e.g., source to destination) one-way delay between selected packets in the transmission with any lost packets being ignored for the purposes of detecting the difference. In some embodiments, the packet delay variation is detected as jitter by the destination application 620 or other component of the destination host. In various embodiments, the time out duration is adjusted based at least in part on a distance between the source and the destination. For example, if the source host is geographically located in Los Angeles and the destination host is geographically located in New York the time out duration may be longer than if the destination host is geographically located in San Diego. Additionally, the time out duration may be determined based at least in part on a moving average of a subset of the packets received. For example, the time out duration may be an average of the amount of time the last N packets took to travel from the source host to the destination host, where N is a positive integer, or an average of the amount of time packets in the last minute (or other length of time) took to travel from the source host to the destination host. The average may also be measured per transmission (i.e., a transmission comprising a set of packets) or for all packets received at the destination from any source. The time for a packet to travel from the source to the destination may be measured as round trip time, such as a TCP round trip estimator.

The sequencing information 662 may include sequence numbers inserted in the encapsulation packets by the source the encapsulating module (e.g., the encapsulating module 548 of FIG. 5) may be used at the destination the encapsulating module 648 to deliver baseline packets in the correct order. If the baseline packet 658 is not received in the expected order at the instance networking stack 624, it may respond by issuing a retransmission request or the source instance networking stack may determine based on a lack of an acknowledgement that a baseline packet 658 has been lost, and may initiate retransmission without a retransmission request having been received from the destination instance networking stack 624. The instance networking stack 624 may assemble an application data payload 630 (e.g., by combining the contents of several different baseline packets 658) and provide it to a destination application 622 at the destination instance 620.

Figure 7:
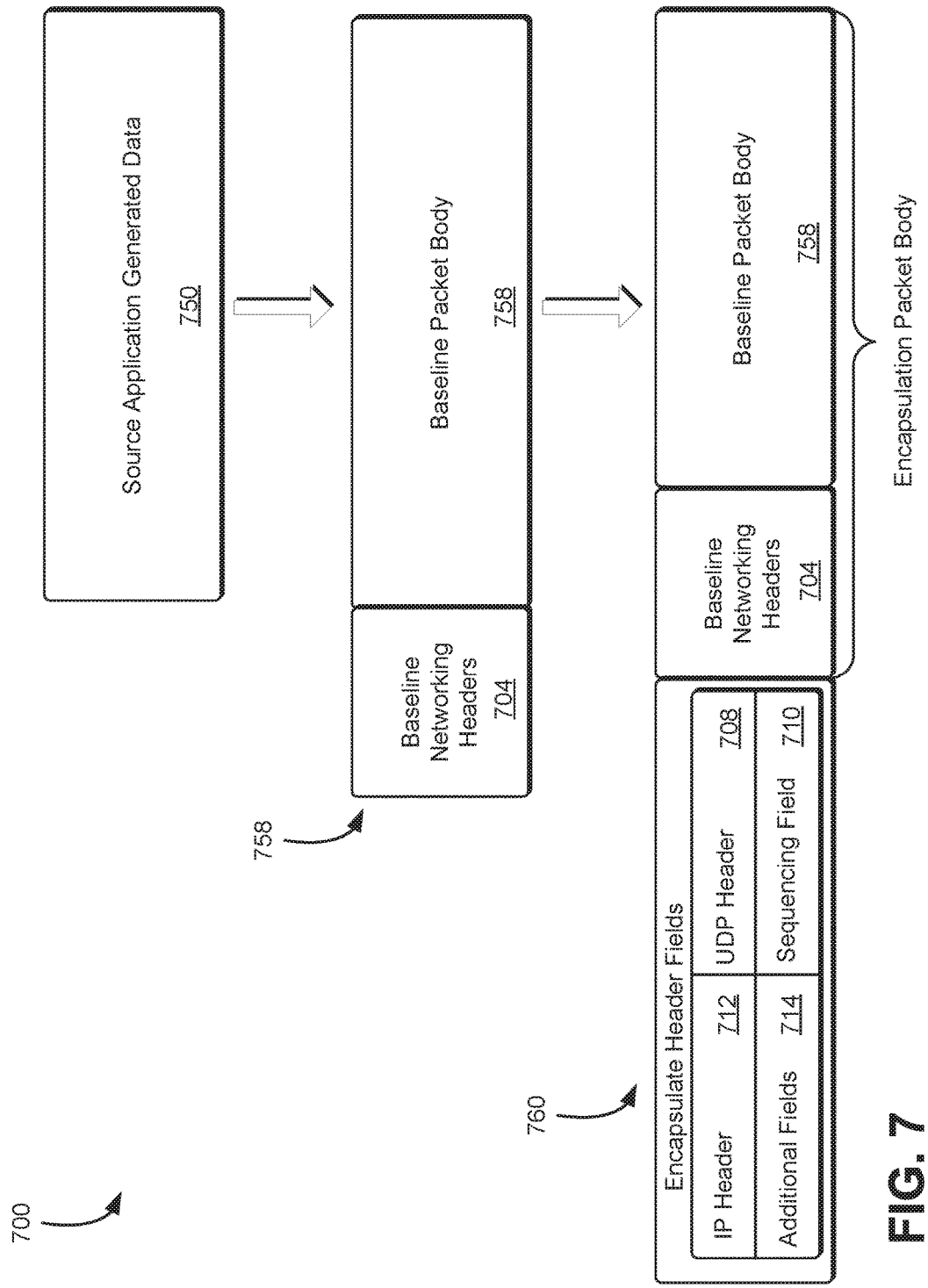
FIG. 7 illustrates example fields that may be added to a baseline packet by an encapsulation module in accordance with an embodiment.

FIG. 7 illustrates example fields that may be added to a baseline packet by an encapsulation module, according to at least some embodiments. As described above, application-generated data 750 to be transferred to a destination may be organized into one or more body portions 750 of baseline packets 758. Each baseline packet may comprise, in addition to the body portion 750, a set of network protocol headers 704 for one or more layers of a networking stack being used for the transfer from the source networking stack to the destination networking stack. For example, in one embodiment, the protocol headers 704 may include one or more of a transport layer header (such as a TCP header), a network layer header (e.g., an IP header), or a link layer header.

An encapsulation intermediary, such as an encapsulating module, may generate values for one or more additional fields 760 to be added to the baseline packet 758 to form a corresponding encapsulation packet 760. As illustrated in FIG. 7, the additional encapsulation fields 760 may include, for example, an IP header 712, a UDP header 708 that includes one or more randomly-generated port numbers or other fields that can be used for hop selection by a routing component, a sequence number (which itself may be derived at least in part from headers of the baseline packet in some embodiments, e.g., from the TCP sequence number of the baseline packet), and/or other fields 714 used for other aspects of the encapsulation protocol in use. Such additional encapsulation fields 714 may, for example, comprise client identifiers, monitoring-related information (e.g., tags that can be used to classify packets based on application type), and/or billing-related metadata. For the encapsulation packet, the body 758 may comprise the entire baseline packet, including the baseline headers 704, as illustrated in FIG. 7. In some embodiments, not all the values added by the source encapsulation intermediary need be header fields; i.e., some added fields may be included in portions of the encapsulation packet that may be considered part of the body rather than the headers. At the destination encapsulation intermediary, the baseline packet may be extracted, and the baseline body may be transferred by the instance networking stack to the destination application.

Figure 8:
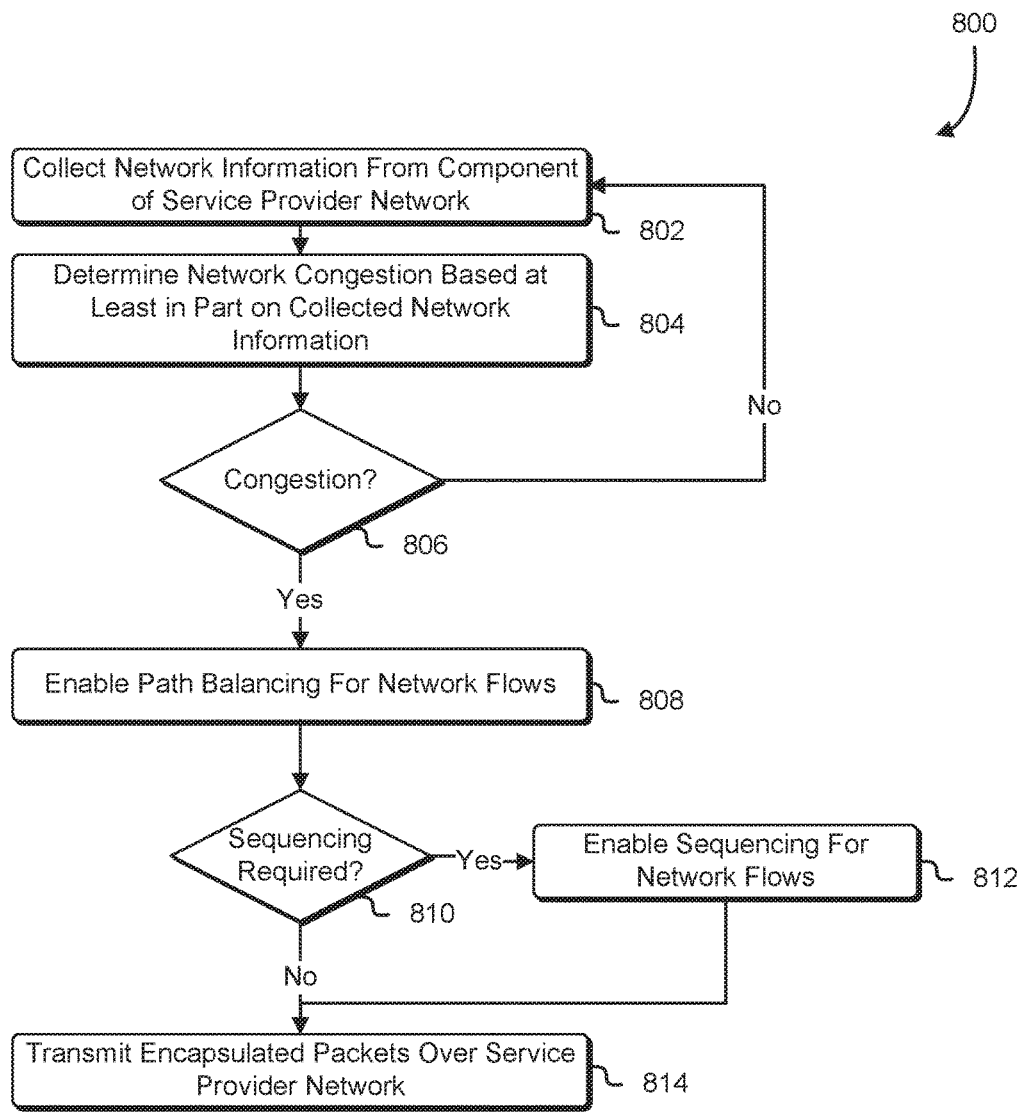
FIG. 8 illustrates an example process for selectively enabling path-balancing and/or sequencing of network traffic in accordance with an embodiment.

FIG. 8 shows an illustrative example of a process 800 which may be used to enable path-balancing for at least a portion of the transmissions in a service provider network in response to detected congestion on the service provider network. The process 800 may be performed by any suitable system or combination of systems such as the routing components and other components of the service provider network described above in connection with FIG. 3. Returning to FIG. 8, in an embodiment, the process 800 includes collecting network information from a component of the service provider network. The component may include a routing component of the service provider network as described above in connection with FIG. 1. The component may also include a physical host or other end point connected to the service provider network. For example, the physical host may provide the service provider or component thereof, such as the virtual machine management service, with network information corresponding to computer instances executed by the physical host. The collected network information may include congestion information, load information, protocol information, operating system information, application information, or other information corresponding to transmissions. For example, the collected network information may include an average bitrate for data transmitted from a computer instance associated with a user. In another example, the source virtualization layer may receive an ECN notification from a destination virtualization layer as a result of congestion detected at a routing component as described above.

The service provider or component thereof may then determine network congestion based at least in part on the collected network information 804. Network congestion may be determined based at least in part on congestion detected at one or more routing components of the service provider network. Network congestion may also be determined indirectly based at least in part on network load information corresponding to transmissions from one or more physical hosts. For example as described above, an average bitrate may be calculated for a set of computer instances operated by a user, the average bitrate may be used by the service provider as an indication of an amount of congestion at any given component of the service provider network. A representative value may be determined based at least in part on the collected network information, the representative value corresponding to a level of congestion at one or more components of the service provider network. Furthermore, the collected network information may be associated with a single transmission. For example as described above, ECN may be used to determine congestion at a routing component of the service provider network. The ECN notifications generated by the routing component may be associated with a single network transmission and source virtualization layer and the destination virtualization layer may be responsible for determining congestion and enabling path-balancing in response to the determined congestion.

If congestion is detected 806, the service provider or component thereof, such as the source virtualization layer, may enable patch balancing for one or more network flows 808. Whether a threshold has been exceeded indicating congestion may be determined based at least in part on the representative value calculated for congestion on the service provider network. Additionally, congestion may be detected based on one or more messages received from routing components or other components of the service provider network. If congestion is not detected 806, the service provider may continue to collect network information 802. Once congestion has been detected the service provider may then enable path-balancing for one or more network flows 808 by at least encapsulating packets as described above. For example, the virtual machine management service may send a command to a virtualization layer causing the virtualization layer to modify the UDP port number included in the encapsulation header for transmissions from a particular computer instance. In another example, the virtualization layer may be configured to alter the UDP port number for each packet received from a computer instance.

Once path-balancing is enable the service provider may determine if sequencing is required 810 for the computer instance for which the transmission path has been altered. For example, the user associated with the computer instance may have selected one or more options for the networking environment corresponding to the user's computer instances. The one or more options may have indicated that for computer instances for which path-balancing is enabled also enable sequencing such that the computer instance receives packets in order. In another example, the virtual machine management service may determine whether to enable sequencing based at least in part on one or more attributes of the computer instance, such as applications executed by the computer instance or operating system of the computer instance. If sequencing is required, the virtualization layer may then enable sequencing for the computer instances or network flows for which path-balancing was enabled 812. Enabling sequencing may include adding sequence numbers and setting a sequence flag to one or more encapsulation headers and/or baseline packet headers. Furthermore, sequencing may require adding additional sequence information to the base line networking headers as described above. Values for the sequencing fields may be determined by the virtualization layer or component thereof such as the encapsulation intermediary. Once path-balancing and/or sequencing has been enabled for the computer instances or transmissions of the computer instances the virtualization layer may then transmit encapsulated packers over the service provider network 814.

Figure 9:
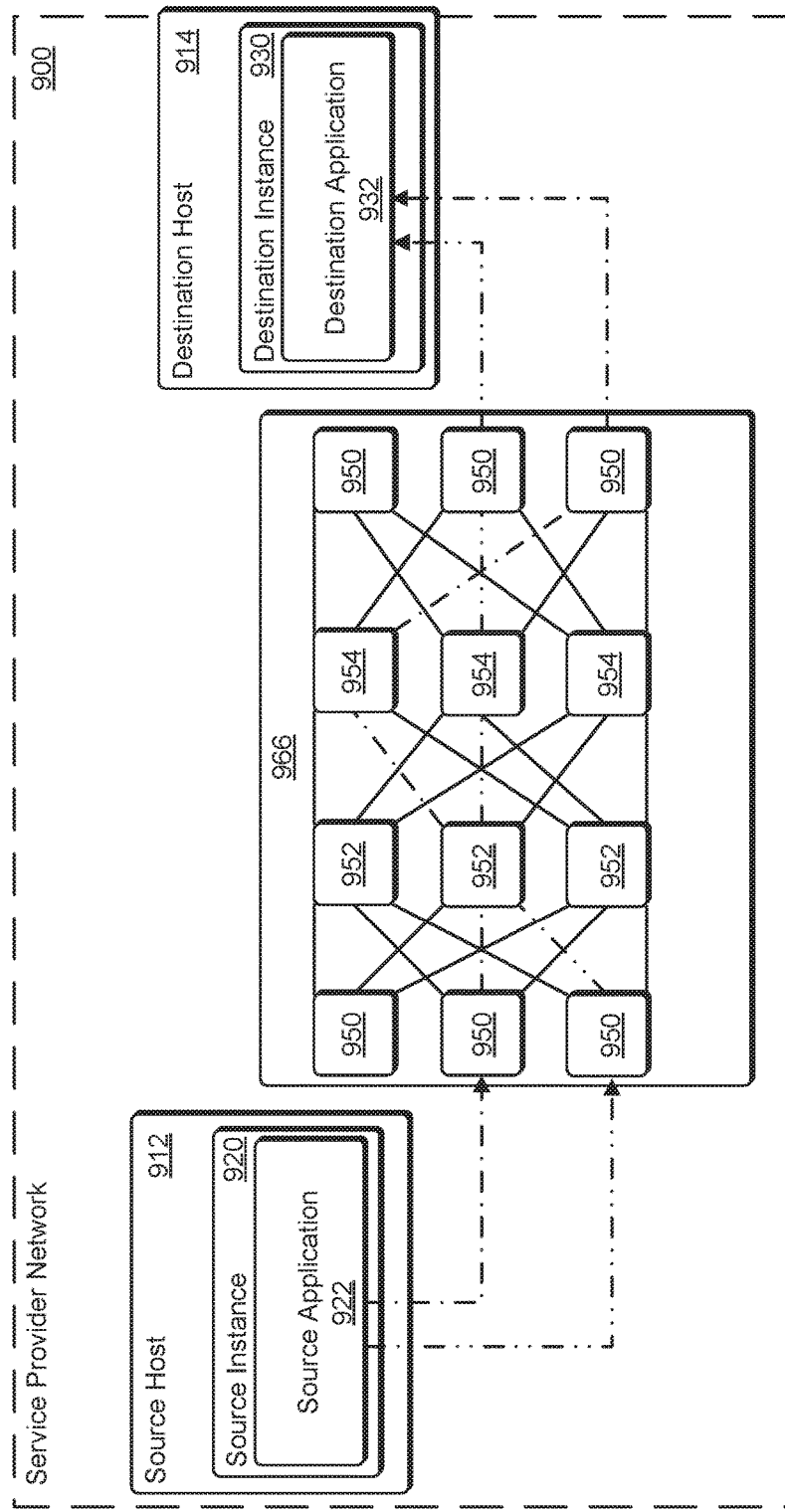
FIG. 9 illustrates an example of a system in which path-balancing is enable for traffic across a service provider network which is linked by a dense, multi-layer, multi-path interconnected network in accordance with an embodiment.

FIG. 9 illustrates an example of a service provider network 900 in which physical hosts of the service provider network 900 are linked by a dense, multi-layer, multi-path interconnected network 966, according to at least some embodiments. As shown, the service provider network 900 comprises at least a source host 912 and a destination host 914. The source host 912 and the destination host 914 may be used for implementing virtual computer instances, such as a source instance 920 and a destination instance 930. The source host 912 and the destination host 914 may include any of the computing devices, processes, hardware modules, or software modules that are owned by, managed by, or allocated to, an entity (such as an organization, a group with multiple users or a single user) that is capable of accessing and utilizing at least one network-accessible service of the service provider network 900, such as the physical hosts described above in connection with FIG. 2. A given service provider network 900 may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments. Clients may interact with resources and services at the provider network from devices located at client-owned or client-managed premises or data centers external to the provider network. The source instance 920 and the destination instance 930 may execute a variety of different application, such as the source application 922 and a destination application 932. In various embodiments, the source application 922 and the destination application 932 may be two different instances of the same application. For example, the same executable code may be used by the source instance 920 to execute the source application 922 and the destination instance 930 to execute the destination application 932.

As shown, the source host 912 and the destination host 914 may be linked via a dense, multi-path, multi-layer internal interconnected network 966 that includes a plurality of different physical paths between the source host 912 and the destination host 914. As illustrated in FIG. 9, the dense interconnected network 966 is shown as comprising a number of distinct layers, including outer layers (i.e., layers directly connected to hosts) comprising interconnect nodes 950, and inner layers (not directly connected to hosts) comprising a different class of interconnected nodes 952 and 954. The nodes 950, 952, and 954 may be nodes as described above in connection with FIG. 3. Returning to FIG. 9, when path-balancing is enable, the nodes 950, 952, and 954 may be configured to route packets between the source host 912 and the destination host 914 along different network paths as illustrated in FIG. 9. For example, the virtualization layer of the source host 912 may be configured to encapsulate baseline packets from the source application 922 as described above. The encapsulated packets may contain information in the header causing the encapsulated packets to be routed between different nodes of the dense interconnected network 966.

Figure 10:
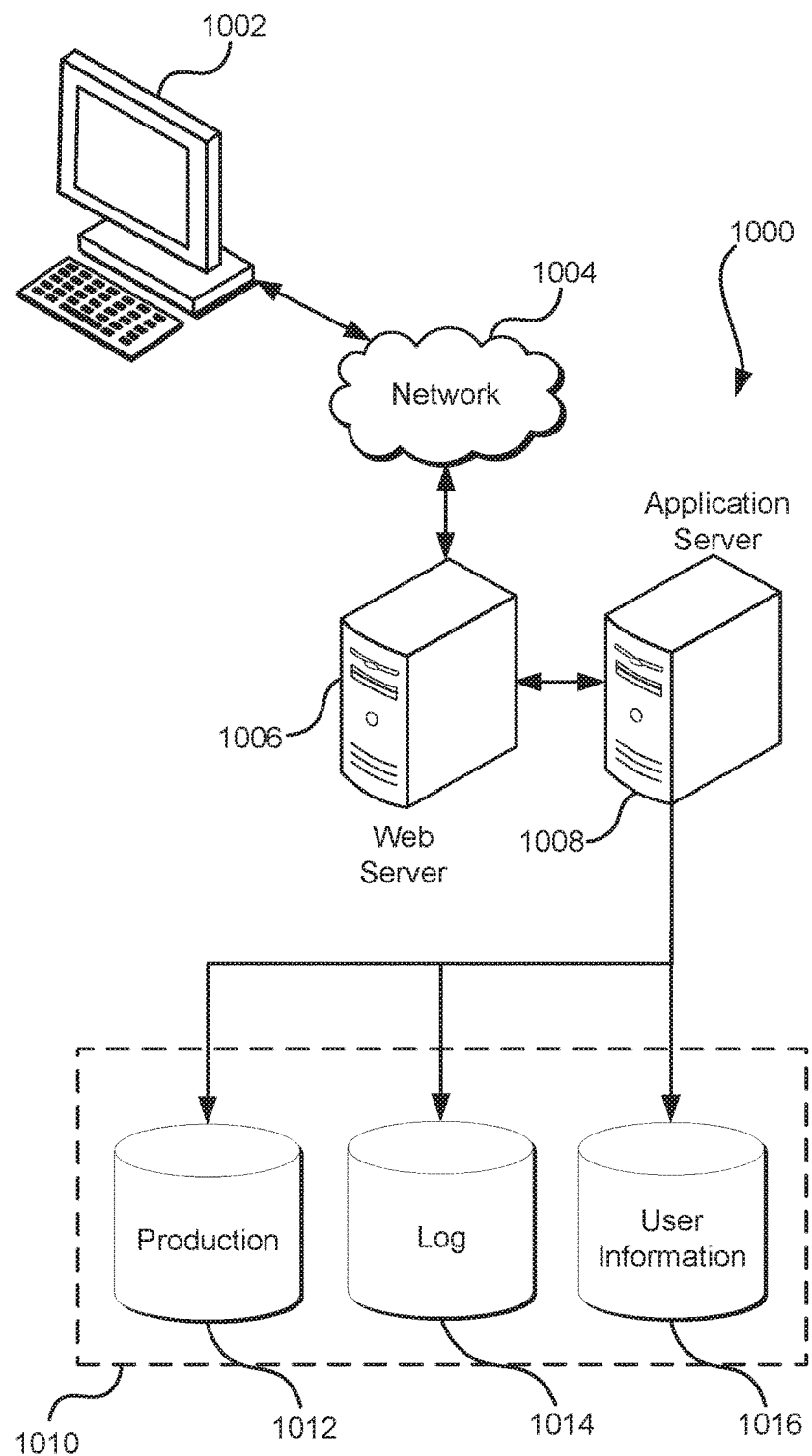
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OBI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    implementing, at a first computer system, a path-balancing policy at a virtualization layer of the first computer system in response to network congestion, the implementing comprising:
        generating a first encapsulated packet based on a first packet of a set of packets, the first encapsulated packet including a first set of values that cause the first packet to be routed along a first network path towards a second computer system; and
        generating a second encapsulated packet based on a second packet of the set of packets, the second encapsulated packet including a second set of values that cause the second packet to be routed along a second network path towards the second computer system.

2. The computer-implemented method of claim 1, wherein the set of packets further comprises a network transmission from a virtual machine instance supported by the first computer system.

3. The computer-implemented method of claim 1, wherein one or more routing devices direct the first encapsulated packet along the first network path based on the first set of values, wherein the one or more routing devices direct the second encapsulated packet along the second path based on the second set of values.

4. The computer-implemented method of claim 1, wherein the first encapsulated packet includes the first set of values in a header of the first encapsulated packet, wherein the second encapsulated packet includes the second set of values in a header of the second encapsulated packet.

5. A system, comprising:
one or more processors; and
memory including executable instructions that, as a result of being executed by the one or more processors, cause the system to:
obtain a set of packets from a first computing instance directed towards a second computing instance over a network;
determine to enable path-balancing for a portion of the set of packets;
generate a set of encapsulated packets corresponding to the portion of packets of the set of packets, the set of encapsulated packets including additional information that when processed by a routing device causes a first encapsulated packet of the set of packets to travel a first path and causes a second encapsulated packet of the set of packets to travel a second path that is distinct from the first path; and
transmit the set of encapsulated packets to the second computing instance.

6. The system of claim 5, wherein the memory further includes executable instructions that, as a result of being executed by the one or more processors, cause the system to:
obtain an indication of network congestion from the second computing instance based on a particular packet of the set of packets.

7. The system of claim 6, wherein the indication of network congestion includes a rate at which one or more packets of the set of packets are received at the second computing instance.

8. The system of claim 5, wherein the network further comprises a plurality of physical networks connected between computing devices on the network creating a plurality of paths between the first computing instance and the second computing instance.

9. The system of claim 5, wherein the network is a Clos network.

10. The system of claim 9, wherein the additional information indicates a port number.

11. The system of claim 5, wherein the first computing instance is a virtual computing instance supported by a hypervisor.

12. The system of claim 5, wherein the executable instructions that cause the system to determine to enable path-balancing further include executable instructions that, as a result of being executed by the one or more processors, cause the system to enable path-balancing based on a failure rate of the set of packets reaching the second computing instance.

13. A non-transitory computer-readable storage medium having stored thereon executable instructions that, when executed by one or more processors of a computer system, cause the computer system to at least:
detect an event triggering a path balancing policy;
encapsulate a first packet within a first encapsulated packet including a first set of values determine based on a path-balancing policy, the first set of values causing one or more computing devices to direct the first encapsulated packet along a first network path;
encapsulate a second packet within a second encapsulated packet including a second set of values determine, based on the path-balancing policy, the second set of values causing the one or more computing devices to direct the second encapsulated packet along a second network path, the first network path and the second network path having at least one different portion; and
provide the first and second encapsulated packets the one or more routing devices.

14. The non-transitory computer-readable storage medium of claim 13, wherein the instructions further comprise instructions that, as a result of being executed by the one or more processors, cause the computer system to implement the path-balancing policy as a result of a number of packets in a queue attaining a certain value relative to a threshold.

15. The non-transitory computer-readable storage medium of claim 14, wherein the instructions further comprise instructions that, as a result of being executed by the one or more processors, cause the computer system to receive an indication from a routing device of the number of packets.

16. The non-transitory computer-readable storage medium of claim 15, wherein the routing device is a top of rack switch.

17. The non-transitory computer-readable storage medium of claim 15, wherein the instructions further comprise instructions that, as a result of being executed by the one or more processors, cause the computer system to determine the first set of values and the second set of values by selecting values of the first set of values and the second set of values randomly.

18. The non-transitory computer-readable storage medium of claim 13, wherein the instructions further comprise instructions that, as a result of being executed by the one or more processors, cause the computer system to determine, based on a round robin strategy, the first set of values and the second set of values.

19. The non-transitory computer-readable storage medium of claim 13, wherein the instructions further comprise instructions that, as a result of being executed by the one or more processors, cause the computer system to determine the first set of values and the second set of values based on an indication of congestion of a particular routing device such that the first network path and the second network path are not directed to the particular routing device.

20. The non-transitory computer-readable storage medium of claim 19, wherein the instructions further comprise instructions that, as a result of being executed by the one or more processors, cause the computer system to determine the first set of values and the second set of values based on information obtained from a computer system.

* * * * *